US012798216B2

United States Patent

(12) United States Patent
Tomiura et al.

(10) Patent No.: US 12,798,216 B2
(45) Date of Patent: *Nov. 17, 2026

(54) LAMINATE HAVING RELEASING PRIMER COMPOSITION LAYERS

(71) Applicant: SAKATA INX CORPORATION, Osaka (JP)

(72) Inventors: Ibuki Tomiura, Osaka (JP); Kyohei Takimoto, Osaka (JP); Junichi Harada, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 292 days.

This patent is subject to a terminal disclaimer.

(21) Appl. No.: 18/713,680

(22) PCT Filed: Sep. 29, 2022

(86) PCT No.: PCT/JP2022/036473

§ 371 (c)(1),
(2) Date: May 27, 2024

(87) PCT Pub. No.: WO2023/100460

PCT Pub. Date: Jun. 8, 2023

(65) Prior Publication Data

US 2025/0018682 A1 Jan. 16, 2025

(30) Foreign Application Priority Data

Nov. 30, 2021 (JP) ................................ 2021-194607
Sep. 14, 2022 (JP) ................................ 2022-146375

(51) Int. Cl.

| | |
|---|---|
| ***B32B 7/06*** | (2019.01) |
| ***B32B 7/12*** | (2006.01) |
| ***B32B 25/16*** | (2006.01) |
| ***B32B 27/28*** | (2006.01) |
| ***B32B 27/32*** | (2006.01) |
| ***B32B 37/15*** | (2006.01) |
| ***C08G 18/10*** | (2006.01) |
| ***C08G 18/64*** | (2006.01) |
| ***C08G 18/69*** | (2006.01) |
| ***C08G 77/04*** | (2006.01) |
| ***C08K 5/5435*** | (2006.01) |
| ***C08K 5/5465*** | (2006.01) |

(52) U.S. Cl.

CPC ................. *B32B 7/06* (2013.01); *B32B 7/12* (2013.01); *B32B 25/16* (2013.01); *B32B 27/283* (2013.01); *B32B 27/32* (2013.01); *B32B 37/15* (2013.01); *C08G 18/10* (2013.01); *C08G 18/6423* (2013.01); *C08G 18/69* (2013.01); *C08G 18/692* (2013.01); *C08G 77/04* (2013.01); *C08K 5/5435* (2013.01); *C08K 5/5465* (2013.01); *B32B 2250/05* (2013.01); *B32B 2307/748* (2013.01)

(58) Field of Classification Search

None

See application file for complete search history.

(56) References Cited

U.S. PATENT DOCUMENTS

| | | | | |
|---|---|---|---|---|
| 2021/0187790 | A1 | 6/2021 | Ohara et al. | |
| 2023/0097817 | A1* | 3/2023 | Kilbo ..................... | D21C 5/025 162/72 |
| 2024/0400867 | A1 | 12/2024 | Tomiura et al. | |

FOREIGN PATENT DOCUMENTS

| | | | | |
|---|---|---|---|---|
| CN | 111605280 | A | 9/2020 | |
| EP | 3932642 | A1 * | 1/2022 | ............... C09D 4/06 |
| EP | 4410545 | A1 | 8/2024 | |
| JP | H0597959 | A | 4/1993 | |
| JP | H0953056 | A | 2/1997 | |
| JP | 2006212786 | A | 8/2006 | |
| JP | 2017114930 | A | 6/2017 | |
| JP | 6388131 | B2 | 9/2018 | |
| JP | 6631964 | B1 | 1/2020 | |
| JP | 6642688 | B1 | 2/2020 | |
| JP | 6690806 | B1 | 4/2020 | |
| JP | 2020175620 | A | 10/2020 | |
| JP | WO2021090690 | A1 | 11/2021 | |
| WO | 2021090690 | A1 | 5/2021 | |

OTHER PUBLICATIONS

Extended European Search Report (EESR) dated Oct. 24, 2025, issued for European counterpart patent application No. EP22900895.8 (7 pages).

International Preliminary Report on Patentability, dated May 2, 2024, for corresponding international application PCT/JP2022/036473 (1 page).

Notification Concerning Transmittal of International Preliminary Report on Patentability, mailed Jun. 13, 2024, for corresponding international application PCT/JP2022/036473 (1 page).

Notification of Transmittal of Translation of the International Preliminary Report on Patentability, mailed Jun. 13, 2024, for corresponding international application PCT/JP2022/036473 (1 page).

Written Opinion of the International Searching Authority, mailed Nov. 29, 2022, for corresponding international application PCT/JP2022/036473 (3 pages).

International Search Report (ISR) mailed Nov. 29, 2022, issued for International application No. PCT/JP2022/036473. (2 pages).

* cited by examiner

*Primary Examiner* — Frank D Ducheneaux

(74) *Attorney, Agent, or Firm* — Law Office of Katsuhiro Arai

(57) ABSTRACT

An object is to obtain a laminate that allows a printed layer to be separated/released more easily from a resin base material or sealant layer using a release solution, while achieving excellent lamination-suitability. As a solution, a laminate comprising a resin base material, a releasing primer layer, a printed layer, a releasing primer layer and a sealant layer, being stacked in this order, is provided, wherein the releasing primer composition for forming the releasing primer layers contains a polyethyleneimine-based compound with an amine value of 5.0 to 25.0 mmol/g and/or polybutadiene-based compound.

9 Claims, No Drawings

LAMINATE HAVING RELEASING PRIMER COMPOSITION LAYERS

CROSS-REFERENCE TO RELATED APPLICATIONS

This application is the U.S. National Phase under 35 U.S.C. § 371 of International Application PCT/JP2022/036473, filed Sep. 29, 2022, which claims priority to Japanese Patent Application No. JP2021-194607, filed Nov. 30, 2021 and No. JP2022-146375, filed Sep. 14, 2022. The International Application was published under PCT Article 21(2) in a language other than English.

TECHNICAL FIELD

The present invention relates to a laminate having releasing primer composition layers.

BACKGROUND ART

Packaging materials using various types of plastic films are used for food, confectionary, articles of daily use, pet food, etc., from the viewpoints of designability, economy, content protection ability, transportability, etc. Also, many packaging materials are gravure-printed or flexographically printed with the intent of adding designs and messages that appeal to the consumer.

These packaging materials are obtained by "printing without post-processing" in which the surface of the base material film constituting the packaging material is simply printed on, or, if necessary, the printed face obtained by printing on the surface of the base material film constituting the packaging material is coated with an adhesive or anchor agent and the base material film is pre-lamination printed.

In the pre-lamination printing, colored ink compositions and a white ink composition are printed one by one on polyester, nylon, aluminum foil, or any of various other types of base material films, after which a polyethylene film, polypropylene film, etc., for heat sealing purpose is layered on the printed layer of the white ink composition by means of dry lamination using an adhesive, extrusion lamination using an anchor coating agent, or the like (refer to Patent Literature 1).

Recent years have seen environmental contamination issues caused by packages made of plastic films, plastic bottles, and other plastic products that are dumped/thrown into the ocean as trash. These plastic products are broken down in sea water into submicron-size debris (microplastics) and float in sea water. If ingested by fish and other marine life, these plastics are condensed in their bodies. This raises a concern that the health of seabirds and humans that ingest these marine life as food may be negatively impacted.

To address these problems, a recycling method for releasing plastic base materials from laminates constituted by layered printing ink compositions is proposed as one of the various efforts to reduce microplastics. The proposed methods for releasing plastic base materials from laminates include releasing ink compositions (refer to Patent Literature 2, for example), releasing adhesives (refer to Patent Literature 3, for example), releasing anchor coating agents, etc. (refer to Patent Literatures 4 to 6, for example) and release solutions (refer to Patent Literature 7, for example).

However, these methods cannot achieve sufficient release when warm water is used as a release solution, and also present a problem of insufficient lamination-suitability and retort-suitability when used with printing ink compositions for laminate. Additionally, the laminates described in these patents, when they use a cast plastic film as a sealant layer, present a problem in that the printed layer will not be released sufficiently from the cast plastic film.

BACKGROUND ART LITERATURE

Patent Literature

Patent Literature 1: Japanese Patent Laid-open No. Hei 5-97959
Patent Literature 2: Japanese Patent No. 6631964
Patent Literature 3: Japanese Patent No. 6642688
Patent Literature 4: Japanese Patent No. 6388131
Patent Literature 5: Japanese Patent Laid-open No. 2020-175620
Patent Literature 6: International Patent Laid-open No. 2021/090690
Patent Literature 7: Japanese Patent No. 6690806

SUMMARY OF THE INVENTION

Problems to be Solved by the Invention

An object of the present invention is to obtain a laminate having releasing primer composition layers that allows a printed layer to be separated/released more easily from a resin base material or sealant layer using a release solution, while achieving excellent lamination-suitability.

Means for Solving the Problems

The inventors of the present invention found that the aforementioned object could be achieved by the laminate described below, and eventually completed the present invention as follows.

1. A laminate comprising a resin base material, a releasing primer layer, a printed layer, a releasing primer layer, and a sealant layer, being stacked in this order, wherein the releasing primer composition for forming the releasing primer layers contains a polyethyleneimine-based compound with an amine value of 5.0 to 25.0 mmol/g and/or a polybutadiene-based compound.
2. The laminate according to 1, wherein the releasing primer composition containing a polyethyleneimine-based compound with an amine value of 5.0 to 25.0 mmol/g and/or the polybutadiene-based compound contains one or more types selected from (a) to (d) below.

(a) A polybutadiene-based compound
(b) A polyethyleneimine compound
(c) A mixture containing a polyethyleneimine compound and a glycidyl group-containing silane coupling agent and/or isocyanate group-containing silane coupling agent
(d) A siloxane-modified polyethyleneimine compound 3. The laminate according to 1 or 2, wherein the laminate is one of (1) to (3) below.

(1) A laminate having, in this order, a resin base material, a releasing primer layer, a printed layer, an adhesive layer, a releasing primer layer, and a sealant layer formed by a dry laminate.
(2) When extrusion lamination is used; a laminate having, in this order, a resin base material, a releasing primer layer, a printed layer, a releasing primer layer, an anchor coating agent, and a sealant layer formed by an extrusion laminate.

(3) When extrusion lamination is used; a laminate having, in this order, a resin base material, a releasing primer layer, a printed layer, a releasing primer layer, and a sealant layer formed by an extrusion laminate.

4. The laminate according to any one of 1 to 3, wherein the number-average molecular weight of the polyethyleneimine compound, and that of the siloxane-modified polyethyleneimine compound, are each independently 1,000 to 200,000.
5. The laminate according to any one of 1 to 4, wherein the mass-average molecular weight of the polyethyleneimine compound, and that of the siloxane-modified polyethyleneimine compound, are each independently 4,000 to 800,000.
6. The laminate using the releasing primer composition according to any one of 1 to 5, wherein the polybutadiene-based compound is a hydroxyl group-containing polybutadiene compound and/or carboxyl group-containing polybutadiene compound.
7. The laminate using the releasing primer composition according to any one of 1 to 6, wherein the sealant layer is formed by a cast plastic film or molten resin.

Effects of the Invention

According to the present invention, a printed layer can be separated/released from a resin base material and sealant layer more easily using a release solution, while excellent lamination-suitability is achieved.

MODE FOR CARRYING OUT THE INVENTION

The present invention is a laminate formed by a resin base material, a releasing primer layer, a printed layer, a releasing primer layer, and a sealant layer, in this order, wherein the releasing primer composition for forming the releasing primer layers contains a polyethyleneimine-based compound with an amine value of 5.0 to 25.0 mmol/g and/or polybutadiene-based compound.

Additionally, when the present invention is applied to a printed matter formed by a resin base material, a releasing primer layer, a printed layer, an adhesive layer, and a releasing primer layer, in this order, any known layer may be formed further between any of these layers, etc.

[Resin Base Material]

For the resin base material, any resin base materials conventionally used in printing ink compositions for laminate can be used.

To be specific, biaxially oriented polypropylene, polyester, oriented nylon, and transparent vapor deposition films, etc., having water resistance, heat resistance, and impact resistance as well as excellent moisture resistance and gas barrier property are preferred.

[Releasing Primer Layer]

The releasing primer layer under the present invention is provided between a resin base material surface and a printed layer, and between the printed layer and a sealant layer. Also, it is a releasing primer layer used, in conjunction with a printed matter which is to be reutilized after use, for separating a resin base material and a printed layer formed thereon, while also separating a sealant layer and the printed layer, thereby releasing the printed layer from the base material and sealant layer.

The releasing primer composition for forming the releasing primer layer is explained.

The present invention is a laminate having a specific releasing primer layer. For example, the releasing primer layer provided between the surface of a resin base material and a printed layer differs in applications and required properties from an anchor coating agent used when an anchor coating layer is formed further on the printed face formed on the base material prior to laminating a resin film, etc., on top.

The releasing primer composition is a composition for forming a releasing primer layer beforehand on a resin base material prior to printing it with a printing ink composition.

Additionally, the releasing primer composition may also be used for forming a releasing primer layer beforehand on a sealant layer prior to dry-laminating a printed layer and the sealant layer.

Additionally, the releasing primer composition may also be used for forming a releasing primer layer beforehand, between a printed layer and a sealant layer prior to extrusion-laminating the printed layer and sealant layer.

The releasing primer composition for forming a releasing primer layer provided in such a way that it is positioned between a resin base material and a printed layer, and the releasing primer composition for forming a releasing primer layer provided in such a way that it is positioned between the printed layer and a sealant layer, may be the same or different.

The releasing primer composition contains a polyethyleneimine-based compound with an amine value of 5.0 to 25.0 mmol/g and/or polybutadiene-based compound.

The releasing primer composition containing a polyethyleneimine-based compound with an amine value of 5.0 to 25.0 mmol/g and/or polybutadiene-based compound, contains one or more types selected from a to d below:

a. a polybutadiene-based compound;
b. a polyethyleneimine compound;
c. a mixture containing a polyethyleneimine compound and a glycidyl group-containing silane coupling agent and/or isocyanate group-containing silane coupling agent; and/or
d. a siloxane-modified polyethyleneimine compound.

(a. Polybutadiene-Based Compound)

Preferably the polybutadiene-based compound is an aqueous composition. Preferably it is a hydroxyl group-containing polybutadiene compound or carboxyl group-containing polybutadiene compound, being a polybutadiene compound to which hydroxyl groups or carboxyl groups have been introduced to make the compound aqueous and improve adhesion. It should be noted that, from the viewpoint of demonstrating releasability, preferably the polybutadiene compound has not been crosslinked. Specific examples include EL-451 (Toyo-Morton, Ltd.), T-180E (Nippon Soda Co., Ltd.), and the like.

(b. Polyethyleneimine Compound)

For the polyethyleneimine compound, the amine value of the polyethyleneimine compound is 15.0 to 25.0 mmol/g; in particular, it is preferably 16.0 mmol/g or higher, and preferably 20.0 mmol/g or lower.

Also, in terms of the amino groups in the molecule, a polyethyleneimine-based compound that has all groups of respective types from primary amino groups to tertiary amino groups is preferred; in particular, preferably the content percentages based on the numbers of amino groups of respective types are such that more secondary amino groups are contained than primary and tertiary amino groups, and more preferably the content of the secondary amino groups in all amino groups from primary to tertiary is 40% or higher based on number of groups. When more of these ranges are met, release can be performed more easily.

It should be noted that the polyethyleneimine compound of b does not include the siloxane-modified polyethyleneimine compound of d, while the siloxane-modified polyethyleneimine compound of d is a compound different from the polyethyleneimine compound of b.

(c. Mixture Containing Polyethyleneimine Compound and One or More Types Selected from Glycidyl Group-Containing Silane Coupling Agent and Isocyanate Group-containing Silane Coupling Agent)

If lamination-suitability is to be improved, preferably the polyethyleneimine compound further contains a silane coupling agent containing glycidyl groups and/or isocyanate groups.

For the polyethyleneimine compound, any polyethyleneimine compound meeting the same conditions described in b above can be used, where this polyethyleneimine compound does not include the siloxane-modified polyethyleneimine compound of d.

Examples of the silane coupling agent containing glycidyl groups include 3-glycidyloxypropyltrimethoxysilane, 3-glycidyloxypropylmethoxydimethoxysilane, 3-glycidyloxypropylmethoxydiethoxysilane, 3-glycidyloxypropyltriethoxysilane, and the like. Examples of the silane coupling agent containing isocyanate groups include 3-isocyanatopropyltriethoxysilane, 3-isocyanatopropyltrimethoxysilane, 2-isocyanateethyltriethoxysilane, 2-isocyanateethyltrimethoxysilane, and the like. From the viewpoint of post-retort lamination-suitability, preferably the silane coupling agent containing glycidyl groups, the silane coupling agent containing isocyanate groups, is/are compounded in such a way that the ratio of the (number of glycidyl groups+number of isocyanate groups in the silane coupling agent(s)) relative to the (number of amino groups in the polyethyleneimine-based compound), i.e., ((number of glycidyl groups in the silane coupling agent+number of isocyanate groups in the silane coupling agent)/(total sum of the number of primary amino groups and number of secondary amino groups in the polyethyleneimine-based compound)), becomes 0.20 to 2.50. It is more preferably 0.30 or higher, or even more preferably 0.50 or higher, while it is more preferably 2.20 or lower, or even more preferably 1.90 or lower.

It should be noted that the number of amino groups represents the total sum of the number of primary amino groups and number of secondary amino groups.

This ratio of the (number of glycidyl groups+number of isocyanate groups in the silane coupling agent(s)) relative to the (number of amino groups in the polyethyleneimine-based compound), i.e., (number of glycidyl groups+number of isocyanate groups in the silane coupling agent(s)/total sum of the number of primary amino groups and number of secondary amino groups in the polyethyleneimine-based compound), can be obtained by the concept formula below:

[(Coating amount of the glycidyl group-containing silane coupling agent (g/m$^2$)×Average number of glycidyl groups in one molecule)/Average molecular weight of the glycidyl group-containing silane coupling agent (g/mmol)]+[(Coating amount of the isocyanate group-containing silane coupling agent (g/m$^2$)×Average number of isocyanate groups in one molecule)/Average molecular weight of the isocyanate group-containing silane coupling agent (g/mmol)]divided by [(Coating amount of the polyethyleneimine-based compound (g/m$^2$)×Amine value (mmol/g))×(Average (number of primary amino groups+number of secondary amino groups) in one molecule)/(Average (number of primary amino groups+number of secondary amino groups+number of tertiary amino groups) in one molecule)].

It should be noted that, when the releasing primer composition under the present invention selectively contains the polyethyleneimine compound of b and the mixture containing a polyethyleneimine compound and a glycidyl group-containing silane coupling agent and/or isocyanate group-containing silane coupling agent of c, a redundancy is created in that a polyethyleneimine compound is contained in both, which means that effectively the mixture containing a polyethyleneimine compound and a glycidyl group-containing silane coupling agent and/or isocyanate group-containing silane coupling agent of c has been selected.

(d. Siloxane-Modified Polyethyleneimine Compound)

If lamination-suitability is to be improved, a siloxane-modified polyethyleneimine compound can be used. The amine value of the siloxane-modified polyethyleneimine compound is preferably 5.0 mmol/g or higher, and preferably 15.0 mmol/g or lower.

For the siloxane-modified polyethyleneimine compound, a silane coupling agent-modified polyethyleneimine compound obtained by reacting components including a polyethyleneimine and at least one type of silane coupling agent being an amine-reactive hydrolysable organosilane expressed by the formula: R—Z—Si$Y_3$ [in the formula, R represents an amine-reactive group selected from the group that consists of isocyanate group, oxiranyl group, glycidoxy group, acryloxy group, carboethoxy group, carbomethoxy group, vinyl sulfonyl group, and acrylamide group, Z represents a divalent organic group containing carbon atoms, and Y's each independently represent a hydrolysable group] can be used.

This siloxane-modified polyethyleneimine compound has a structure in which the silane coupling agent has bonded to the polyethyleneimine as a result of the group R in the silane coupling agent reacting with the amino groups in the polyethyleneimine. As mentioned above, however, preferably the siloxane-modified polyethyleneimine compound has a specified amine value.

For the polyethyleneimine compound of b or c above and siloxane-modified polyethyleneimine compound of d that may be contained in the primer composition under the present invention, in terms of molecular weight, those that each independently have a number-average molecular weight of 1,000 to 200,000 are preferred from the viewpoint of lamination-suitability. Also, those that each independently have a mass-average molecular weight of 4,000 to 800,000 are preferred.

It should be noted that the siloxane-modified polyethyleneimine compound of d is not included in the polyethyleneimine compound of b or polyethyleneimine compound of c above, representing a compound different from the polyethyleneimine compounds.

(Releasing Primer Composition)

The releasing primer composition contains the respective components mentioned above and, in addition, preferably it is based on a solvent comprising a mixture of water and one or more types of alcohol selected from methanol, ethanol and isopropyl alcohol.

(Releasing Primer Layer)

The releasing primer composition layer provided between the resin base material and printed layer, or between the printed layer and sealant layer, is such that the coating amount (solids content) of the releasing primer composition is preferably 0.010 g/m$^2$ or higher, or more preferably 0.015 g/m$^2$ or higher. Also, it is preferably 0.400 g/m$^2$ or lower, or more preferably 0.300 g/m$^2$ or lower, or yet more preferably 0.200 g/m$^2$ or lower.

[Printed Layer]

The printed layer is formed by a printing ink composition for laminate.

For the printing ink composition for laminate, any conventionally used printing ink compositions for laminate can be utilized.

<Printing Ink Composition for Laminate Used in Printing for Laminate>

The printing ink composition for laminate contains a pigment, a binder resin, various types of additives, and solvents. It is not limited to the composition below.

(Pigment)

For the pigment used in the printing ink composition for laminate, one or more types of known inorganic and organic pigments conventionally used in printing ink compositions for laminate can be used.

The inorganic pigments include, for example, titanium oxide, red iron oxide, antimony red, cadmium yellow, cobalt blue, Prussian blue, ultramarine blue, carbon black, graphite, and other colored pigments, as well as extender pigments such as silica particles, calcium carbonate, kaolin, clay, barium sulfate, aluminum hydroxide, talc, and the like. Of these, preferably titanium oxide is used as a white pigment.

The organic pigments include, for example, oil-soluble azo pigments, insoluble azo pigments, azo lake pigments, condensed azo pigments, copper phthalocyanine pigments, condensed polycyclic pigments, and the like.

The content of these pigments in the printing ink composition is normally around 1 to 50% by mass.

(Binder Resin)

For the binder resin, a polyurethane resin, or preferably from the viewpoints of stability, adhesion property, and lamination-suitability of the printing ink composition, a polyurethane resin having an amine value, is contained.

(Polyurethane Resin)

For the polyurethane resin, a polyurethane resin not modified by acid and/or polyurethane resin modified by acid may be contained. A polyurethane resin not modified by acid is a polyurethane resin having no carboxylic acid groups, sulfonic acid groups, phosphoric acid groups, or other acid groups at the ends of the molecule and/or other locations in the molecule. A polyurethane resin modified by acid is a polyurethane resin having carboxylic acid groups, sulfonic acid groups, phosphoric acid groups, or other acid groups at the ends of the molecule and/or other locations in the molecule.

Whether the printed layer is formed by an ink composition using a polyurethane resin modified by acid as a vehicle, or it is formed by an ink composition using as a vehicle a polyurethane resin not modified by acid or other resin that inherently makes releasing difficult, the printed layer can be smoothly released from the resin base material.

For such polyurethane resins, any polyurethane resins generally used in printing ink compositions can be used.

In particular, polyurethane resins having amino groups (having an amine value) are preferred from the viewpoints of stability over time, adhesion property, and lamination-suitability of the printing ink composition. Of the polyurethane resins having amino groups, those having one or more types selected from primary amino groups, secondary amino groups, and tertiary amino groups at the ends of the molecule, or particularly those having one or more types selected from primary amino groups and secondary amino groups at the ends of the molecule, are more preferred.

Yet more preferred are polyurethane resins having hydroxyl groups and also having one or more types selected from primary amino groups, secondary amino groups, and tertiary amino groups at the ends of the molecule.

When its polyurethane resin has specific functional groups such as the amino groups, the printing ink composition will have excellent printability and adhesion property as a printing ink composition for laminate.

The amine value of the polyurethane resin is preferably 1.0 to 15.0 mgKOH/g, or more preferably 2.0 to 8.0 mgKOH/g.

If the amine value is under 1.0 mgKOH/g, the adhesion property of the printing ink composition for laminate under the present invention with respect to films can drop, with the lamination-suitability also becoming lower; whereas, if the amine value exceeds 15.0 mgKOH/g, the anti-blocking property can drop.

It should be noted that, under the present invention, the amine value refers to the amine value per 1 gram of solids content, representing a value measured by the potentiometric titration method (such as COMTITE (AUTO TITRATOR COM-900, BURET B-900, TITSTATION K-900), Hiranuma Sangyo Co., Ltd.) using a 0.1N aqueous hydrochloric acid solution and then converting the result to a potassium hydroxide equivalent.

Also, preferably the polyurethane resin has hydroxyl groups in the molecule and at the ends of the molecule from the viewpoint of resolubility.

(Polyurethane Resin Not Modified by Acid)

For the polyurethane resin not modified by acid, a polyurethane polyurea resin, and/or polyurethane polyurea resin obtained using a compound resulting from ketiminating the amino groups in a polyamine compound with a ketone compound, is/are preferred.

A polyurethane polyurea resin is based on a urethane prepolymer obtained from an organic diisocyanate component and a high-molecular diol component, which is turned into a polyurethane polyurea resin by extending the chain and/or stopping the reaction.

And, a polyurethane polyurea resin obtained using a ketiminated compound represents, in terms of the chain extender and/or reaction terminator, (a) a polyurethane polyurea resin obtained by reacting with a urethane prepolymer a compound resulting from ketiminating the amino groups in a polyamine compound in an organic solvent using a ketone compound, or (b) a polyurethane polyurea resin obtained by adding to and mixing under agitation with a urethane prepolymer a compound resulting from ketiminating the amino groups in a polyamine compound in an organic solvent using a ketone compound, followed by addition of water and subsequent chain extension and reaction termination, where using the (a) and/or (b) allows the obtained printing ink composition for laminate to have less amine odor and demonstrate excellent stability over time.

Regarding the polyurethane polyurea resin, a biomass polyurethane polyurea resin may be contained in consideration of the environmental aspect.

(Polyurethane Polyurea Resin Not Modified by Acid)

The polyurethane polyurea resin not modified by acid has one or more types selected from primary amino groups and secondary amino groups at the ends of the molecule.

More preferred is a polyurethane polyurea resin not modified by acid that has hydroxyl groups and also has one or more types selected from primary amino groups and secondary amino groups at the ends of the molecule.

For such polyurethane polyurea resins, any polyurethane resin obtained by reacting an organic diisocyanate compound and a high-molecular diol compound to synthesize a urethane prepolymer, to which the chain extender and reaction terminator below are reacted, can be used favorably.

(Synthesis of Urethane Prepolymer)

The aforementioned urethane prepolymers are each obtained by reacting an organic diisocyanate compound and a high-molecular diol compound as described below.

(Organic Diisocyanate Compound)

The organic diisocyanate compound may be, for example, tolylene diisocyanate or other aromatic diisocyanate compound, 1,4-cyclohexanediisocyanate, isophorone diisocyanate, dicyclohexylmethane-4,4-diisocyanate (hydrogenated MDI), or other alicyclic diisocyanate compound, hexamethylene diisocyanate or other aliphatic diisocyanate compound, or α,α,α',α'-tetramethylxylylene diisocyanate or other aromatic aliphatic diisocyanate compound. Any one type selected from these organic diisocyanate compounds can be used alone, or two or more types can be mixed. In particular, alicyclic diisocyanate compounds, aliphatic diisocyanate compounds, and aromatic aliphatic diisocyanate compounds are preferred.

Also, other organic diisocyanate compounds, such as 1,3- and/or 1,4-phenylene diisocyanate, 4,4-diisocyanato biphenyl, 3,3-dimethyl-4,4-diisocyanato biphenyl, and other aromatic diisocyanate compounds, cyclohexylene diisocyanate, methylcyclohexylene diisocyanate (hydrogenated TDI), and other alicyclic diisocyanate compounds, ethylene diisocyanate, tetramethylene diisocyanate, dodecamethylene diisocyanate, 2,2,4-trimethylhexamethylene diisocyanate, and other aliphatic diisocyanate compounds, and m- and/or p-xylylene diisocyanate (XDI) and other aromatic aliphatic diisocyanate compounds, can also be utilized.

If other organic diisocyanate compounds are also used, they can be used in such a way that the number of isocyanate groups in the other organic diisocyanate compounds becomes 50% or less relative to the total number of isocyanate groups in all organic diisocyanate compounds, where the percentage is preferably 30% or lower, or more preferably 10% or lower.

Alternately, the other organic diisocyanate compounds account for 50 parts by mass or less, or preferably 30 parts by mass or less, or more preferably 10 parts by mass or less, in all organic diisocyanate compounds representing 100 parts by mass.

(High-Molecular Diol Compound)

The high-molecular diol compound may be, for example, polyethylene glycol, polypropylene glycol or other polyalkylene glycol, ethylene oxide-, propylene oxide-, or other alkylene oxide-adduct of bisphenol A or other polyether diol compound, polyester diol obtained by condensation-reacting one, two, or more types of dibasic acids such as adipic acid, sebacic acid, phthalic anhydride, etc., and one, two, or more types of glycols such as ethylene glycol, propylene glycol, 1,4-butanediol, neopentyl glycol, 3-methyl-1,5-pentanediol, etc., polycaprolactone diol, or other polyester diol compound, or the like. Any one type selected from these high-molecular diol compounds can be used alone, or two or more types can be mixed.

Additionally, any one type, or mixture of two or more types, selected from low-molecular diol compounds such as 1,4-pentanediol, 2,5-hexanediol, 3-methyl-1,5-pentanediol, and other alkanediols, ethylene glycol, propylene glycol, 1,4-butanediol, 1,3-butanediol, and the like, can be used in addition to the high-molecular diol compound.

Also, for the high-molecular diol compound, one with a number-average molecular weight of 1,000 to 8,000 is preferred, one with a number-average molecular weight of 1,000 to 5,500 is more preferred, or one with a number-average molecular weight of 1,000 to 4,000 is yet more preferred.

Also, for the high-molecular diol compound, one containing 3-methyl-1,5-pentylene adipate diol can be selected.

In this case, the following may also be combined as other high-molecular diol compounds.

The high-molecular diol compounds other than 3-methyl-1,5-pentylene adipate diol include polyester diols obtained by condensation-reacting one, two, or more types of dibasic acids such as adipic acid, sebacic acid, phthalic anhydride, etc., and one, two, or more types of glycols such as ethylene glycol, propylene glycol, 1,4-butanediol, neopentyl glycol, 3-methyl-1,5-pentanediol, etc., polycaprolactone diols, and other polyester diol compounds, as well as polyethylene glycol, polypropylene glycol, and other polyalkylene glycols, ethylene oxide-, propylene oxide-, and other alkylene oxide-adducts of bisphenol A and other polyether diol compounds, and the like. Any one of these high-molecular diol compounds can be used alone, or two or more types can be mixed.

Of the above, 3-methyl-1,5-pentylene adipate diol obtained by condensation-reacting adipic acid and 3-methyl-1,5-pentanediol, having a number-average molecular weight of 1,000 to 8,000, is preferred, while 3-methyl-1,5-pentylene adipate diol having a number-average molecular weight of 1,000 to 4,000 is more preferred.

If other high-molecular diol compounds are also used, they can be used in such a way that the number of hydroxyl groups in the other high-molecular diol compounds becomes 70% or less relative to the total number of hydroxyl groups in all high-molecular diol compounds, where the percentage is preferably 55% or lower, or more preferably 40% or lower.

Alternately, the other high-molecular diol compounds account for 50 parts by mass or less, or preferably 35 parts by mass or less, or more preferably 20 parts by mass or less, in all high-molecular diol compounds representing 100 parts by mass.

It should be noted that, if the organic solvent used in the printing ink composition for laminate is a mixed solvent system (hereinafter also referred to as "mixed solution") consisting of an ester-based solvent and an alcohol-based solvent as described below, use of a polyether diol compound, or preferably polypropylene glycol, as a high-molecular diol compound tends to increase solubility of the obtained polyurethane resin, while it also tends to achieve good printability in terms of tone reproducibility, antifogging property, etc., thereby allowing a wide range of printing ink compositions to be designed according to the required performance, which is desirable.

(Biomass Polyurethane Polyurea Resin Not Modified by Acid)

As the polyurethane resin, any biomass polyurethane polyurea resin not modified by acid may be contained in consideration of environmental aspects. Biomass polyurethane polyurea resins not modified by acid are explained below. It should be noted that, of the explanations of biomass polyurethane polyurea resins not modified by acid, those explanations common to the polyurethane polyurea resins not modified by acid and already mentioned above are omitted as deemed appropriate.

A biomass polyurethane polyurea resin not modified by acid is a polyurethane resin containing biomass-derived (plant-derived) components. Biomass polyurethane polyurea resins not modified by acid can help prevent global warming and reduce environmental burdens compared to when other exhaustible resources are used. Also, preferably the biomass polyurethane polyurea resin not modified by acid is one obtained by synthesizing a biomass urethane prepolymer by reacting a bio-polyester polyol compound and an organic diisocyanate compound and then, if necessary, reacting a chain extender/reaction terminator thereto, where more preferably the isocyanate compound is a plant-derived bio-isocyanate.

(Isocyanate Compound)

Any plant oil-derived diisocyanate, other than the organic diisocyanates explained in connection with the polyurethane polyurea resins not modified by acid, can be used. A plant oil-derived organic diisocyanate compound is obtained by converting a plant-derived dicarboxylic acid into terminal amino groups through acid amidation and reduction, and by further converting the amino groups into isocyanate groups by reacting them with a phosgene. The plant-derived bio-polyisocyanate may be dimer acid diisocyanate (DDI), octamethylene diisocyanate, decamethylene diisocyanate, or the like. In addition, a plant-derived isocyanate compound can also be obtained by starting from a plant-derived amino acid as a raw material and converting its amino groups into isocyanate groups. For example, lysine diisocyanate (LDI) is obtained by methyl-esterifying the carboxyl groups in lysine and then converting the amino groups into isocyanate groups. Also, 1,5-pentamethylene diisocyanate is obtained by decarboxylating the carboxyl groups in lysine and then converting the amino groups into isocyanate groups.

(Bio-Polyester Polyol Compound)

The bio-polyester polyol compound (biomass polyester polyol) is explained below.

In consideration of the environmental aspect, a bio-polyester polyol compound obtained by synthesizing materials including plant-derived components, among other bio-polyester polyol compounds, may also be combined as one of the aforementioned other high-molecular diol compounds.

Also, a polyurethane polyurea resin not modified by acid, obtained by reacting a polyester polyol compound containing a bio-polyester polyol compound with any of the aforementioned specific isocyanate compounds, can be mixed into the polyurethane polyurea resin not modified by acid under the present invention.

Accordingly, a bio-polyester polyol obtained by reacting a short-chain diol compound with 2 to 4 carbon atoms and a carboxylic acid compound can be adopted as the bio-polyester polyol compound. As for the bio-polyol component, preferably at least one of the short-chain diol compound and carboxylic acid compound is plant-derived, or more preferably both are plant-derived.

The plant-derived short-chain diol compound with 2 to 4 carbon atoms is not specifically limited. For example, the short-chain diol compound may be 1,3-propanediol, 1,4-butanediol, ethylene glycol, etc., obtained from plant materials according to the methods below. Two or more of these may be combined.

1,3-propanediol can be manufactured from a glycerol by way of 3-hydroxypropylaldehyde (HPA) according to the fermentation method wherein a plant resource (such as corn, etc.) is broken down to obtain glucose. A 1,3-propanediol component manufactured by a biological method such as the fermentation method presents superior safety, provides lactic acid and other useful byproducts, and can also keep the manufacturing cost low, compared to a 1,3-propanediol component obtained by the EO manufacturing method. 1,4-butanediol can be manufactured by manufacturing a glycol from a plant resource and fermenting it to obtain a succinic acid, and then hydrogenating the succinic acid. Also, ethylene glycol can be manufactured by way of ethylene from a bioethanol obtained by a conventional method.

The plant-derived carboxylic acid compound is not specifically limited. For example, the carboxylic acid compound may be sebacic acid, succinic acid, lactic acid, glutaric acid, dimer acid, etc. Two or more of these may be used together. Of these, preferably at least one type selected from the group that consists of sebacic acid, succinic acid, and dimer acid is contained in the carboxylic acid compound. Also, 0.05 to 0.5 parts by mass of malic acid may be contained relative to 100 parts by mass of sebacic acid.

The bio-polyester polyol compound is produced as a 100% plant-derived bio-polyester polyol by condensation-reacting a plant-derived short-chain diol compound and a plant-derived carboxylic acid as deemed appropriate. To be specific, polytrimethylene sebacate polyol is obtained by directly dehydration-condensing plant-derived sebacic acid and plant-derived 1,3-propanediol. Also, polybutylene succinate polyol is obtained by directly dehydration-condensing plant-derived succinic acid and plant-derived 1,4-butanediol.

One or more types of these bio-polyester polyol compounds may be used.

Urethane prepolymers obtained using these plant-derived components may be contained by 10% by mass or more, or 40% by mass or more, in terms of solids content, in all urethane prepolymers.

(Chain Extender and Reaction Terminator)

Next, the chain extender and reaction terminator used with the polyurethane polyurea resin not modified by acid and biomass polyurethane polyurea resin not modified by acid are explained.

For the chain extender, any known chain extenders utilized in polyurethane polyurea resins that function as binders for printing ink compositions can be utilized, such as polyamine compounds including ethylenediamine, propylenediamine, tetramethylenediamine, hexamethylenediamine, and other aliphatic diamines, isophoronediamine, 4,4'-dicyclohexylmethanediamine, and other alicyclic diamines, tolylenediamine and other aromatic diamines, xylenediamine and other aromatic aliphatic diamines, N-(2-hydroxyethyl)ethylenediamine (aminoethylethanolamine), N-(2-hydroxyethyl)propylenediamine, N,N'-di(2-hydroxyethyl)ethylenediamine, and other diamines having hydroxyl groups, as well as ethylene glycol, propylene glycol, 1,4-butanediol, neopentyl glycol, diethylene glycol, triethylene glycol, and other diol compounds, for example.

Additionally, diethylenetriamine, triethylenetetramine, and other polyamine compounds can also be combined to the extent that the polyurethane polyurea resin will not gelate.

Examples of the reaction terminator for introducing primary amino groups and secondary amino groups to the ends of the polyurethane polyurea resin include polyamine compounds such as ethylenediamine, propylenediamine, tetramethylenediamine, hexamethylenediamine, and other aliphatic diamines, isophoronediamine, 4,4'-dicyclohexylmethanediamine, and other alicyclic diamines, diethylenetriamine, triethylenetetratriamine, and other polyamines, tolylenediamine and other aromatic diamines, xylenediamine and other aromatic aliphatic diamines, N-(2-hydroxyethyl)ethylenediamine (aminoethylethanolamine), N-(2-hydroxyethyl)propylenediamine, and other diamines having hydroxyl groups, and the like. Of these, diethylenetriamine, triethylenetetratriamine and other polyamines having primary amino groups are preferred.

Examples of the reaction terminator for introducing hydroxyl groups to the polyurethane polyurea resin include monoethanolamine, diethanolamine, and other alkanolamines, N-(2-hydroxyethyl)ethylenediamine, N-(2-hydroxyethyl)propylenediamine, and other diamines having hydroxyl groups. Also, monoamine compounds and monoalcohol compounds, which are known reaction terminators, can be utilized, where specific examples include n-propylamine, n-butylamine, and other monoalkylamines, di-n-butylamine and other dialkylamines, ethanol and other monoalcohols.

Regarding the method for manufacturing the polyurethane polyurea resin not modified by acid and biomass polyurethane polyurea resin not modified by acid, any known method for manufacturing a polyurethane resin using the aforementioned materials can be used directly. Also, since the hardness of the obtained polyurethane resin will differ when the mass-average molecular weight, chemical structure, and equivalent ratio of each component are different, printability and lamination-suitability can be adjusted by combining these components as deemed appropriate.

The mass-average molecular weight of the polyurethane polyurea resin not modified by acid and biomass polyurethane polyurea resin not modified by acid is preferably 10,000 to 70,000, or more preferably 20,000 to 60,000.

Additionally, to achieve appropriate flexibility and higher lamination strength, a polyurethane resin which has no urea bonds and whose mass-average molecular weight is 1,000 to 70,000 can be compounded as the polyurethane resin.

(Reaction of Organic Diisocyanate Compound and High-Molecular Diol Compound)

Also, when reacting the organic diisocyanate compound and high-molecular diol compound, the use ratio of the two, or equivalent ratio of isocyanate groups:hydroxyl groups (isocyanate index), is in a range of normally 1.2:1.0 to 3.0:1.0, or preferably 1.3:1.0 to 2.0:1.0. If the isocyanate index is lower than 1.2, the polyurethane polyurea resin not modified by acid and biomass polyurethane polyurea resin not modified by acid tend to become flexible, potentially leading to low anti-blocking property, etc., when the printing ink composition is printed, in which case other hard resins may have to be combined.

A catalyst can be used when reacting the organic diisocyanate compound and high-molecular diol compound to obtain the polyurethane polyurea resin not modified by acid and biomass polyurethane polyurea resin not modified by acid used under the present invention.

In particular, use of organic metal-based compounds is preferred, where such organic metal-based compounds include dibutyl titanium dichloride, tetrabutyl titanate, butoxy titanium trichloride, and other titanium compounds, dibutyl tin sulfide, tributyl tin sulfide, tributyl tin oxide, dibutyl tin dichloride, dibutyl tin oxide, dibutyl tin dibromide, dibutyl tin dimaleate, dibutyl tin dilaurate, dibutyl tin diacetate, dioctyl tin dilaurate, tributyl tin acetate, tributyl tin chloride, triethyl tin ethoxide, tributyl tin ethoxide, dioctyl tin oxide, tributyl tin trichloroacetate, tin 2-ethylhexanoate, and other tin compounds, lead oleate, lead 2-ethylhexanoate, lead benzoate, lead naphthenate, and other lead compounds, as well as iron 2-ethylhexanoate, iron acetylacetonate, cobalt benzoate, cobalt 2-ethylhexanoate, zinc naphthenate, zinc 2-ethylhexanoate, zirconium naphthenate, and the like. Of these, tetrabutyl titanate and other titanium compounds are preferred.

Tertiary amine compounds can also be used; for example, triethylamine, triethylenediamine, 1,4-diazabicyclo(2,2,2)octane, and 1,8-diazabicyclo(5,4,0)-undecene-7 (DBU) can be used.

(Polyurethane Polyurea Resin Not Modified by Acid Obtained Using Compound Resulting from Ketiminating Amino Groups in Polyamine Compound with Ketone Compound, and Biomass Polyurethane Polyurea Resin Not Modified by Acid Obtained Using Compound Resulting from Ketiminating Amino Groups in Polyamine Compound with Ketone Compound)

The polyurethane polyurea resin not modified by acid obtained using a compound resulting from ketiminating the amino groups in a polyamine compound with a ketone compound, and biomass polyurethane polyurea resin not modified by acid obtained using a compound resulting from ketiminating the amino groups in a polyamine compound with a ketone compound, are each obtained using, of the aforementioned chain extenders and/or reaction terminators, a ketimine compound resulting from ketiminating a polyamine compound beforehand with an excessive amount of ketone compound, by means of (c) adopting a compound resulting from ketiminating the amino groups in a polyamine compound in an organic solvent using a ketone compound and reacting the compound with a urethane prepolymer and/or biomass urethane prepolymer, or (d) adopting a compound resulting from ketiminating the amino groups in a polyamine compound in an organic solvent using a ketone compound and adding it to, and mixing under agitation with, a urethane prepolymer and/or biomass urethane prepolymer, followed by addition of water and subsequent chain extension and reaction termination, thereby manufacturing a polyurethane polyurea resin not modified by acid or biomass polyurethane polyurea resin not modified by acid. In particular, preferably, of the aforementioned chain extenders and reaction terminators, one or more types selected from isophoronediamine, N-(2-hydroxyethyl)ethylenediamine, and ethylenediamine is/are adopted.

A polyamine compound ketiminated with a ketone compound has a structure in which the oxygen atoms in the ketone compound have been substituted by the nitrogen atoms in the amino groups in the polyamine compound.

Also, for the ketone compound used, acetone, diethyl ketone, methyl ethyl ketone, diacetone alcohol, or methyl isobutyl ketone is preferred.

Preferably, in this ketiminating reaction, solvents other than the ketone compound are not used.

However, alcohol compounds can be used as solvents other than the ketone compound. In particular, isopropyl alcohol can be used.

"Solvents other than the ketone compound are not used" is defined as ketiminating under solvent-free conditions. It should be noted that, to the extent that doing so does not inhibit the subsequent chain extension reaction or odor-free state of the polyurethane polyurea resin not modified by acid or biomass polyurethane polyurea resin not modified by acid, a polar organic solvent may be compounded instead of using solvent-free conditions.

The present invention may be a printing ink composition containing a polyurethane polyurea resin not modified by acid and/or biomass polyurethane polyurea resin not modified by acid, obtained through a process of extending the chain and terminating the reaction by the method of (c) or (d) above using a ketiminated chain extender and/or reaction terminator, and this printing ink composition, and a printed matter printed therewith, do not produce ketimine odor.

Also, peel strength can be increased when the printed face is laminated by dry lamination, extrusion lamination, or other means.

It should be noted that a ketiminated amine, etc., may be used as a chain extender, or as a reaction terminator, or both as a chain extender and reaction terminator.

(Synthesis of Polyurethane Polyurea Resin Not Modified by Acid Obtained Using Compound Resulting from Ketiminating Amino Groups in Polyamine Compound with Ketone Compound, and Biomass Polyurethane Polyurea Resin Not Modified by Acid Obtained Using Compound Resulting from Ketiminating Amino Groups in Polyamine Compound with Ketone Compound)

The polyurethane polyurea resin not modified by acid and biomass polyurethane polyurea resin not modified by acid, obtained using a compound resulting from ketiminating the amino groups in a polyamine compound with a ketone compound, using a compound resulting from ketiminating the amine groups in a polyamine compound with can be obtained using a ketimine compound resulting from ketiminating a polyamine compound beforehand with an excessive amount of ketone compound, on a urethane prepolymer and/or biomass urethane prepolymer obtained by reacting an organic diisocyanate compound and a high-molecular diol compound, by means of (e) adopting a compound resulting from ketiminating the amino groups in a polyamine compound in an organic solvent using a ketone compound and reacting the compound with the urethane prepolymer and/or biomass urethane prepolymer, or (f) adopting a compound resulting from ketiminating the amino groups in a polyamine compound in an organic solvent using a ketone compound and adding it to, and mixing under agitation with, the urethane prepolymer and/or biomass urethane prepolymer, followed by addition of water and subsequent chain extension and reaction termination.

If a solvent is used at the time of reaction, preferably an ester-based solvent and/or alcohol-based solvent, or more preferably a mixture of ester-based solvent and alcohol-based solvent, or yet more preferably propyl acetate and isopropyl alcohol, is/are used, where most preferably propyl acetate and isopropyl alcohol are used at a ratio by mass in a range of 1:1 to 5:1.

(Polyurethane Resin Modified by Acid, and Biomass Polyurethane Resin Modified by Acid)

For the polyurethane resin for forming a printed layer under the present invention, a polyurethane resin modified by acid and/or biomass polyurethane resin modified by acid can also be adopted. It may be used together with the aforementioned polyurethane resin not modified by acid and/or biomass polyurethane resin not modified by acid, or only the polyurethane resin modified by acid and/or biomass polyurethane resin modified by acid, or only the polyurethane resin not modified by acid and/or biomass polyurethane resin not modified by acid, may be used.

For the polyurethane resin modified by acid and biomass polyurethane resin modified by acid, those obtained by any conventionally known method by reacting the high-molecular diol component being a polyurethane resin-constituting high-molecular diol compound, and pyromellitic anhydride or other tetrabasic acid anhydride, or by using a high-molecular diol compound having the free carboxyl groups obtained through ring-opening polymerization of lactones using dimethylolpropionic acid, dimethylolbutanoic acid, etc., as an initiator, or by using dimethylolpropionic acid, dimethylolbutanoic acid, or other hydroxycarboxylic acid together with a polyurethane resin-constituting high-molecular diol compound, can be used. Preferably the acid value of the polyurethane resin modified by acid and biomass polyurethane resin modified by acid is 70 mgKOH/g or lower.

Other binder resins that can be used with the polyurethane resin for forming a printed layer under the present invention are explained.

(Vinyl Chloride/Vinyl Acetate-based Copolymer)

For the vinyl chloride/vinyl acetate-based copolymer that may be compounded in the printing ink composition for laminate, one manufactured by any known method using any vinyl chloride monomer and vinyl acetate monomer conventionally used in gravure printing ink compositions as the essential components, and if necessary, vinyl propionate, vinyl monochloroacetate, vinyl versatate, vinyl laurate, vinyl stearate, vinyl benzoate, or other fatty acid vinyl monomer or monomer having hydroxyl groups or other functional groups as the copolymerization component, can be used.

A vinyl chloride/vinyl acetate-based copolymer having hydroxyl groups is obtained by partially saponifying an acetic acid ester or introducing a (meth)acrylic monomer having hydroxyl groups.

In the case of a vinyl chloride/vinyl acetate-based copolymer having hydroxyl groups obtained by partially saponifying an acetic acid ester, the film properties and solution behaviors of the resin will be determined by the ratio of the structure units based on the reaction location of vinyl chloride (formula 1 below), structure units based on the reaction location of vinyl acetate (formula 2 below), and structure units based on saponification of the reaction location of vinyl acetate (formula 3 below), in the molecule. Specifically, the structure units based on the reaction location of vinyl chloride add strongness and hardness to the resin film, structure units based on the reaction location of vinyl acetate add adhesion property and flexibility, and structure units based on saponification of the reaction location of vinyl acetate add to the printing ink composition good solubility in environmentally friendly organic solvent systems.

$$—CH_2—CHCl— \quad \text{Formula 1}$$

$$—CH_2—CH(OCOCH_3)— \quad \text{Formula 2}$$

$$—CH_2—CH(OH)— \quad \text{Formula 3}$$

It should be noted that, from the viewpoints of solubility in the organic solvent described below used in the printing ink composition for laminate, and of printability, the vinyl chloride/vinyl acetate-based copolymer may have various types of functional groups in the molecule.

Also, when an environmentally friendly solvent is used as the organic solvent, preferably the vinyl chloride/vinyl acetate-based copolymer has 50 to 200 mgKOH/g of hydroxyl groups. Of the commercial products representing such vinyl chloride/vinyl acetate-based copolymer, preferably SOLBIN A, AL, TASR, TA2, TA3, TAO, TAOL, etc. (Nisshin-Chemical Industry Co., Ltd.), are used, for example.

(Vinyl Chloride/Acrylic-Based Copolymer)

The vinyl chloride/acrylic-based copolymer that can be compounded in the printing ink composition for laminate is one whose primary component is a copolymer of vinyl chloride and acrylic monomer, where the type of copolymer is not specifically limited. For example, the acrylic monomer may be blocked or randomly inserted in the main chain of polyvinyl chloride, or it may be graft-copolymerized to the side chain of polyvinyl chloride.

For the acrylic monomer, (meth)acrylic acid esters, acrylic monomers having hydroxyl groups, etc., can be used. Examples of the (meth)acrylic acid esters include (meth) acrylic acid alkyl esters, where the alkyl groups may be straight-chain, branched or cyclic, but preferably they are straight-chain alkyl groups.

For example, they include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth) acrylate, decyl (meth)acrylate, dodecyl (meth)acrylate, tetradecyl (meth)acrylate, hexadecyl (meth)acrylate, octadecyl (meth)acrylate, and the like.

Examples of the acrylic monomers having hydroxyl groups include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 6-hydroxyhexyl (meth) acrylate, 8-hydroxyoctyl (meth)acrylate, and other (meth) acrylic acid hydroxy alkyl esters, polyethylene glycol mono (meth)acrylate, polypropylene glycol mono(meth)acrylate, 1,4-cyclohexanedimethanol mono(meth)acrylate, and other glycol mono(meth)acrylates, caprolactone-modified (meth) acrylate, hydroxy ethyl acrylamide, and the like.

Also, for the acrylic monomer, acrylic monomers having functional groups other than hydroxyl groups can also be used. Examples of the functional groups other than hydroxyl groups include carboxyl groups, amide bond groups, amino groups, alkylene oxide groups, and the like.

Preferably the vinyl chloride/acrylic-based copolymer has a mass-average molecular weight of 10,000 to 70,000.

Also, from the viewpoints of solubility in any environmentally friendly solvent used as the organic solvent, and of adhesion property with respect to base materials, preferably the vinyl chloride/acrylic-based copolymer has hydroxyl groups amounting to 50 to 200 mgKOH/g.

The printing ink composition for laminate can contain the polyurethane resin and (vinyl chloride/vinyl acetate-based copolymer and/or vinyl chloride/acrylic-based copolymer) at a ratio (ratio by mass) of polyurethane resin/(vinyl chloride/vinyl acetate-based copolymer and/or vinyl chloride/acrylic-based copolymer)=95/5 to 45/55, or preferably 92/8 to 70/30.

It should be noted that the ratio of polyurethane resin/(vinyl chloride/vinyl acetate-based copolymer) may be in a range of 90/10 to 75/25, while that of polyurethane resin/(vinyl chloride/acrylic-based copolymer) may be in a range of 95/5 to 85/15.

And, by containing the polyurethane resin and vinyl chloride/vinyl acetate-based copolymer and/or vinyl chloride/acrylic-based copolymer at a ratio of 95/5 to 45/55, the printing ink composition for laminate will have superior printability and adhesion property with respect to films. Additionally, when the ink composition is to be laminated, it will have superior lamination-suitability.

If the ratio of polyurethane resin/(vinyl chloride/vinyl acetate-based copolymer and/or vinyl chloride/acrylic-based copolymer) exceeds 95/5, the percentage of (vinyl chloride/vinyl acetate-based copolymer and/or vinyl chloride/acrylic-based copolymer) can become low, and adhesion property with respect to films will become insufficient.

If the ratio of polyurethane resin/(vinyl chloride/vinyl acetate-based copolymer and/or vinyl chloride/acrylic-based copolymer) is below 45/55, on the other hand, the percentage of (vinyl chloride/vinyl acetate-based copolymer and/or vinyl chloride/acrylic-based copolymer) becomes high, causing the printed matter formed with the printing ink composition to harden, and again, adhesion property with respect to films can become insufficient.

Also, the total content of the polyurethane resin and vinyl chloride/vinyl acetate-based copolymer and/or vinyl chloride/acrylic-based copolymer in the printing ink composition for laminate is favorably 5 to 30% by mass.

Also, the printing ink composition for laminate can contain one or more types selected from adhesion-improving agents and anti-blocking agents, or preferably adhesion-improving agents and anti-blocking agents are used together, to the extent that the intended performance of the present invention will not drop.

(Adhesion-Improving Agent)

Examples of the adhesion-improving agents that can be compounded in the printing ink composition for laminate include rosin or derivative thereof, chlorinated polypropylene, dammar resin, and the like, where preferably at least one or more types, or more preferably two or more types, selected from rosin or derivatives thereof is/are contained.

(Rosin or Derivative Thereof)

Rosin encompasses gum rosin, tall oil rosin, wood rosin, and the like. In general, rosin is an amber-colored amorphous resin obtained from pine and exists as a mixture due to its natural origin; however, rosin may be isolated into constitutional components such as abietic acid, neoabietic acid, palustric acid, pimaric acid, isopimaric acid, sandaracopimaric acid, and dehydroabietic acid, and used as such, and they are also defined as rosin under the present invention.

A rosin derivative is a compound obtained by modifying the rosin, and examples are specifically listed below.

(1) Hydrogenated rosin: Rosin whose weatherability has been improved by adding hydrogen to the conjugated double bonds (hydrogenation).

(2) Disproportionated rosin: Disproportionation refers to a modification involving a reaction of two rosin molecules, converting the abietic acid in the two molecules having conjugated double bonds and turning one molecule into an aromatic molecule and the other into a molecule with isolated double bonds. In general, disproportionated rosin has poorer weatherability than hydrogenated rosin, but demonstrates better weatherability than untreated rosin.

(3) Rosin-modified phenol resin: Rosin-modified phenol resin is sometimes used as a main binder. Rosin-modified phenol resin can be obtained by a known manufacturing method.

(4) Rosin ester: Ester resin derived from rosin, which has been used for a long time as a tackifier in glues/adhesives.

(5) Rosin-modified maleic acid resin: Rosin that has been addition-reacted with maleic acid anhydride, including rosin to which glycerin or other hydroxyl group-containing compound esterified with anhydrous acid groups has been grafted.

(6) Polymerized rosin: Derivative containing a dimerized resin acid, derived from natural resin rosin.

Other types of known rosin or rosin derivatives can also be used, where any one of these can be used alone or two or more can be combined.

Additionally, preferably each rosin or rosin derivative has an acid value of 120 mgKOH/g or higher. When the acid value is 120 mgKOH/g or higher, lamination strength will improve. More preferably the acid value is 160 mgKOH/g or higher. Also, preferably the total use amount of any rosin or derivatives thereof, if compounded in, is 0.1 to 3.0% by mass, in terms of % by mass of solids, in the printing ink composition for laminate.

(Chlorinated Polypropylene)

For the chlorinated polypropylene, any chlorinated polypropylene with a degree of chlorination of 20 to 50 can be used. Chlorinated polypropylene with a chlorination degree under 20 tends to have lower compatibility with organic solvents. If its chlorination degree exceeds 50, on the other hand, such chlorinated polypropylene tends to have lower adhesion property with respect to films. It should be noted that, under the present invention, the chlorination degree is defined by the % by mass of the chlorine atoms in the chlorinated polypropylene resin. Also, preferably the chlorinated polypropylene is either a modified or unmodified chlorinated polypropylene with a mass-average molecular weight of 5,000 to 200,000. Chlorinated polypropylene with a mass-average molecular weight under 5,000 tends to have lower adhesion property. If its mass-average molecular weight exceeds 200,000, on the other hand, such chlorinated polypropylene tends to have lower solubility in organic solvents. Also, the use amount of any chlorinated polypropylene, if compounded in, is 0.1 to 3.0% by mass, in terms of % by mass of solids, in the printing ink composition for laminate.

(Dammar Resin)

Dammar resin, also denoted as damar, dammar, is a type of plant-derived natural resin. To be specific, it is a type of natural resin obtained from the Dipterocarpaceae or Burseraceae native to Southeast Asia such as Malaysia and Indonesia. When it is used, it is dissolved in an appropriate organic solvent and made into a varnish. Since dammar resin does not contain chlorine, using it allows for elimination/reduction of chlorine compared to when chlorinated polypropylene is used in the printing ink composition. Also, preferably the use amount of any dammar resin, if compounded in, is 3.0% by mass or lower, in terms of % by mass of solids, in the printing ink composition for laminate.

(Anti-blocking Agent)

Examples of anti-blocking agents include silica particles, polyethylene wax, fatty acid amide, cellulose acetate butyrate resin, cellulose acetate propionate resin, nitrocellulose, and the like, where one or more types, or preferably two or more types, selected from silica particles, polyethylene wax, and fatty acid amide is/are contained, and, depending on the type of pigment, preferably cellulose acetate butyrate resin, cellulose acetate propionate resin, or nitrocellulose is further contained.

(Silica Particles)

The silica particles include those that are naturally produced or synthesized, crystalline or non-crystalline, hydrophobic or hydrophilic, and the like. Silica particles with an average particle size of 1.0 to 5.0 μm are preferred (it should be noted that the average particle size of silica particles refers to the particle size based on the cumulative 50% value (D50) in particle size distribution and can be obtained by the coulter counter method). The silica particles may be hydrophilic silica having hydrophilic functional groups on their surface, or hydrophobic silica whose hydrophilic functional groups have been modified with an alkyl silane, etc., and hydrophobized, of which the hydrophilic type is preferred, and the hydrophilic silica particles contained in the printing ink composition also have an effect of promoting the wetting/spreading of the printing ink composition during overprinting to improve overprinting effects (hereinafter also referred to as "trapping property"). The use amount of the silica particles is preferably 3.0% by mass or less, or more preferably 0.1 to 1.0% by mass, in the printing ink composition for laminate.

(Polyethylene Wax)

For the polyethylene wax, preferably those with an average particle size in a range of 1.0 to 3.0 μm (it should be noted that the average particle size refers to the particle size measured by Honeywell's Microtrac UPA) are used. If the particle size of the polyethylene wax is smaller than 1.0 μm, slip property and antiblocking property will drop, while a particle size larger than 3.0 μm can lead to lower trapping property. Also, preferably the content of the polyethylene wax in the printing ink composition for laminate is in a range of 0.1 to 1.5% by mass. If the content is lower than 0.1% by mass, the desired effects cannot be obtained, while a content higher than 1.5% by mass can lead to lower gloss.

(Nitrocellulose)

For the nitrocellulose, any nitrocellulose conventionally used in gravure printing ink compositions can be used. Nitrocellulose is obtained as a nitric acid ester by reacting natural cellulose with nitric acid to substitute the three hydroxyl groups in the six-member ring of anhydrous glucopyranose groups in the natural cellulose with nitric acid groups. For the nitrocellulose used under the present invention, nitrocellulose having a nitrogen content of 10 to 13% and average polymerization degree of 35 to 90 is favorably used. Specific examples include SS1/2, SS1/4, SS1/8, TR1/16, NCRS-2 (Korea CNC Ltd.), and the like. Regarding the content of nitrocellulose, preferably the nitrocellulose is used by a range of 0.1 to 2.0% by mass in the printing ink composition for laminate, depending on the type of pigment.

(Cellulose Acetate Propionate Resin)

For the cellulose acetate propionate resin, those conventionally used in gravure printing ink compositions can be used.

A cellulose acetate propionate resin is obtained by triesterifying cellulose with acetic acid and propionic acid, followed by hydrolyzation. In general, cellulose acetate propionate resins with 0.6 to 2.5% by mass of acetylation, 42 to 46% by mass of propionylation, and 1.8 to 5% by mass of hydroxyl groups are commercially available. Preferably the cellulose acetate propionate resin is used by a range of 0.1 to 3.0% by mass in the printing ink composition for laminate depending on the type of pigment.

(Cellulose Acetate Butyrate Resin)

For the cellulose acetate butyrate resin, those conventionally used in gravure printing ink compositions can be used.

A cellulose acetate butyrate resin is obtained by triesterifying cellulose with acetic acid and butyric acid, followed by hydrolyzation. In general, resins with 2 to 30% by mass of acetylation, 17 to 53% by mass of butyrylation, and 1 to 5% by mass of hydroxyl groups, are commercially available. Regarding the use amount of cellulose acetate butyrate resin, preferably it is used by a range of 0.1 to 3.0% by mass in the printing ink composition for laminate depending on the type of pigment.

(Fatty Acid Amide)

The fatty acid amide is not specifically limited so long as it has residue left by removing the acid groups from a fatty acid, and amide groups. The fatty acid amide may be, for example, a monoamide, substituted amide, bisamide, methylolamide, ester amide, or the like, of which at least one type selected from the group that consists of monoamide, substituted amide, and bisamide is preferred in the interest of improving anti-blocking property. Preferably the use amount of fatty acid amide is in a range of 0.01 to 1.0% by mass in the printing ink composition for laminate.

Monoamide: A monoamide is expressed by general formula (1) below:

$R_1$—$CONH_2$ General formula (1)

(In the formula, $R_1$ represents a residue left by removing COOH from a fatty acid.)

Specific examples of monoamides include lauric acid amide, palmitic acid amide, stearic acid amide, behenic acid amide, hydroxystearic acid amide, oleic acid amide, erucic acid amide, and the like.

Substituted amide: A substituted amide is expressed by general formula (2) below:

$R_2$—CONH—$R_3$ General formula (2)

(In the formula, $R_2$ and $R_3$ each represent a residue left by removing COOH from a fatty acid and may be the same or different.)

Specific examples of substituted amides include N-oleyl palmitic acid amide, N-stearyl stearic acid amide, N-stearyl oleic acid amide, N-oleyl stearic acid amide, N-stearyl erucic acid amide, and the like.

Bisamide: A bisamide is expressed by general formula (3) or general formula (4) below:

$R_4$—CONH—$R_5$—HNCO—$R_6$ General formula (3)

$R_7$—NHCO—$R_8$—CONH—$R_9$ General formula (4)

(In the formulas, $R_4$, $R_6$, $R_7$ and $R_9$ each represent a residue left by removing COOH from a fatty acid and may be the same or different, while $R_5$ and $R_8$ each represent an alkylene group or arylene group with 1 to 10 carbon atoms.)

Specific examples of bisamides include methylene-bis-stearic acid amide, ethylene-bis-capric acid amide, ethylene-bis-lauric acid amide, ethylene-bis-stearic acid amide, ethylene-bis-hydroxystearic acid amide, ethylene-bis-behenic acid amide, hexamethylene-bis-stearic acid amide, hexamethylene-bis-behenic acid amide, hexamethylene hydroxystearic acid amide, ethylene-bis-oleic acid amide, ethylene-bis-erucic acid amide, hexamethylene-bis-oleic acid amide, N,N'-distearyl adipic acid amide, N,N'-distearyl sebacic acid amide, N,N'-dioleyl adipic acid amide, N,N'-dioleyl sebacic acid amide, and the like.

Methylolamide: A methylolamide is expressed by general formula (5) below:

$R_{10}$—$CONHCH_2OH$ General formula (5)

(In the formula, $R_{10}$ represents a residue left by removing COOH from a fatty acid.)

Specific examples of methylolamides include methylol-palmitic acid amide, methylol-stearic acid amide, methylol-behenic acid amide, methylol-hydroxystearic acid amide, methylol-oleic acid amide, methylol-erucic acid amide, and the like.

Ester amide: An ester amide is expressed by general formula (6) below:

$R_{11}$—CONH—$R_{12}$—OCO—$R_{13}$ General formula (6)

(In the formula, $R_{11}$ and $R_{13}$ each represent a residue left by removing COOH from a fatty acid and may be the same or different, while $R_{12}$ represents an alkylene group or arylene group with 1 to 10 carbon atoms.)

Specific examples of ester amides include stearylamide ethyl stearate, oleylamide ethyl stearate, and the like.

Preferably the melting point of the fatty acid amide is 50 to 150 °C.

Also, the fatty acid constituting the fatty acid amide comprises preferably a saturated fatty acid with 12 to 22 carbon atoms and/or unsaturated fatty acid with 16 to 25 carbon atoms, or more preferably a saturated fatty acid with 16 to 18 carbon atoms and/or unsaturated fatty acid with 18 to 22 carbon atoms. For the saturated fatty acid, lauric acid, palmitic acid, stearic acid, behenic acid, and hydroxystearic acid are particularly preferred, and for the unsaturated fatty acid, oleic acid and erucic acid are particularly preferred.

(Organic Solvent)

The printing ink composition for laminate for forming a printed layer is oily. The organic solvent used therefor may be, in common with the ink compositions for front printing and shrink printing, for example, methanol, ethanol, isopropanol, normal propanol, butanol, isobutanol, tert-butanol, or other alcohol-based solvent, toluene, xylene, or other aromatic hydrocarbon-based solvent, hexane, cyclohexane, methyl cyclohexane, ethyl cyclohexane, or other aliphatic hydrocarbon-based solvent, acetone, methyl ethyl ketone, methyl isobutyl ketone, cyclohexanone, or other ketone-based solvent, ethyl acetate, n-propyl acetate, isopropyl acetate, butyl acetate, isobutyl acetate, sec-butyl acetate, tert-butyl acetate, or other ester-based solvent, ethylene glycol monomethyl ether, ethylene glycol monoethyl ether, ethylene glycol dimethyl ether, ethylene glycol monobutyl ether, propylene glycol monomethyl ether, propylene glycol monoethyl ether, propylene glycol monopropyl ether, propylene glycol monobutyl ether, or other glycol-based solvent or esterified product thereof, where the esterified product to be selected, which is primarily an acetated product, may be, for example, ethylene glycol monomethyl ether acetate, ethylene glycol monoethyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, or the like. Any one of these can be used alone, or two or more types can be combined.

From the aspect of environmental issues, preferably a mixed solvent comprising ester-based organic solvent, alcohol-based organic solvent, and ketone-based organic solvent, or a mixed solvent comprising ester-based organic solvent and alcohol-based organic solvent that can better address environmental issues, is used.

Additionally, in the printing ink composition for laminate, a glycol ether-based organic solvent can also be contained by 0.1 to 20% by mass in 100% by mass of organic solvent in order to improve wettability and spreadability. Specific examples of the glycol ether-based organic solvent include ethylene glycol monomethyl ether, diethylene glycol monomethyl ether, ethylene glycol mono-n-propyl ether, ethylene glycol monoisopropyl ether, diethylene glycol monoisopropyl ether, ethylene glycol monobutyl ether, diethylene glycol monobutyl ether, ethylene glycol monoisobutyl ether, propylene glycol monomethyl ether, dipropylene glycol monomethyl ether, propylene glycol mono-n-propyl ether, diethylene glycol dimethyl ether, diethylene glycol methyl ethyl ether, diethylene glycol diethyl ether, and the like.

Preferably water is contained in the printing ink composition for laminate from the viewpoints of mitigation of printing problems caused by static electricity as well as fogging prevention and cell reproducibility. The use amount of the water is preferably 10% by mass or less, or more preferably in a range of 0.1 to 5.0% by mass, in the printing ink composition for laminate.

(Other Materials)

Various types of additives such as pigment dispersant, anti-static agent, plasticizer, etc., can be added to the printing ink composition for laminate.

(Method for Manufacturing Printing Ink Composition for Laminate

Regarding the method for manufacturing the printing ink composition for laminate using the above constituent materials, a method of mixing under agitation the pigment, binder resin, organic solvent, and if necessary, pigment dispersant, surfactant, etc., and then kneading the mixture utilizing any of various types of kneading machines including a bead mill, ball mill, sand mill, attritor, roll mill, pearl mill, etc., for example, and then further adding the various types of specified additives and remaining materials and mixing them, is utilized.

Also, metal tetraalkoxides and/or hydroxy acids may or may not be contained.

(Printing Method Using Printing Ink Composition for Laminate, and Laminate Obtained by Same)

Next, the method for obtaining a laminate by lamination using the printing ink composition for laminate is explained.

The laminate by lamination under the present invention is formed by a resin base material, a releasing primer layer, a printed layer, and a sealant layer, in this order; however, any layer known to be used in laminates by lamination, such as anchor coating agent layer, adhesive layer, etc., may or may not be provided between the respective layers. Also, the resin base material, releasing primer layer, printed layer, and sealant layer may each be formed by multiple layers. Additionally, it may be formed by a resin base material, a releasing primer layer, a printed layer, a releasing primer layer, a printed layer, and a sealant layer, for example, in this order.

Methods for obtaining a laminate by lamination include at least the printing method below.

For example, the releasing primer composition proposed by the present invention is coated on the resin base material being a known resin film that will constitute a base material for laminate. On the obtained releasing primer composition layer, the printing ink composition for laminate is printed inline or offline once or more times by gravure printing or any other type of printing, and then dried with a dryer.

The printing speed and drying temperature of the printing ink composition for laminate can be adopted from known speeds and temperatures as deemed appropriate.

[Sealant Layer]

The sealant layer is formed by a resin film which is used when a layering means involving dry lamination is adopted, or by a molten resin which is used when an extrusion lamination-based layering means is adopted. Examples of the resin film include cast plastic films (such as cast polyethylene films, cast polypropylene films, and other cast polyolefin resin films), while examples of the molten resin include low-density polyethylene, polypropylene, and other polyolefin resins, ethylene-vinyl acetate copolymers, and the like.

The formed sealant layer differs slightly in the properties of its layered interface depending on whether it is derived from a resin film or formed by layering a molten resin.

[Methods for Creating Laminate Having Releasing Primer Layers]

Next, how to obtain a laminate having releasing primer layers is explained.

Methods for obtaining a laminate having releasing primer layers include at least the methods of (1) and (2) below.

(1) The releasing primer composition is coated on one side of the resin base material to form a releasing primer layer. Next, on the surface of the releasing primer layer, the printing ink composition for laminate is printed once or more times by gravure printing or any other type of printing and dried to form a printed layer.

Separately from these steps, the releasing primer composition is coated on one side of the sealant layer film and dried to create a film for sealant layer having a releasing primer layer.

An adhesive is coated on the surface of the printed layer to form an adhesive layer, followed by a dry lamination method in which the face on the releasing primer layer side of the sealant layer having the releasing primer layer is oriented toward and pasted onto the surface of the adhesive layer, thereby creating a laminate having releasing primer layers conforming to the present invention.

It should be noted that the dry lamination method represents a method of coating a urethane-based, isocyanate-based, or other adhesive on the surface of a printed layer formed by a printing ink composition for laminate, and then pasting a sealant layer having a releasing primer layer using a known dry lamination machine. A laminate having releasing primer layers can also be obtained using any known method other than such dry lamination method.

(2) The releasing primer composition is coated on one side of the resin base material to form a releasing primer layer. Next, on the surface of the releasing primer layer, the printing ink composition for laminate is printed once or more times by gravure printing or any other type of printing, and dried to form a printed layer.

Next, on the printed layer, the releasing primer composition is coated and dried, after which an anchor coating agent is coated on the formed releasing primer layer and dried, followed by an extrusion lamination method in which a molten resin such as polyethylene is layered/solidified on the anchor coating agent layer, thereby creating a laminate having releasing primer composition layers conforming to the present invention.

It should be noted that the extrusion lamination method represents a method of coating a urethane-based, isocyanate-based, polyethyleneimine-based, or other anchor coating agent on the surface of a releasing primer layer, and then layering a molten polyethylene using a known extrusion lamination machine.

If the releasing primer layer uses a polyethyleneimine-based compound, the polyethyleneimine-based compound also acts as an anchor coating agent, and therefore the aforementioned anchor coating agent may or may not be used.

EXAMPLES

The present invention is explained in greater detail below using examples; however, the present invention is not limited to these examples alone. It should be noted that, unless otherwise specified, "%" refers to "% by mass," while "part" refers to "part by mass." Also, the number indicating the amount of each material in the tables also represents "parts by mass." The releasing primer compositions used in the Examples and Comparative Examples are mixtures whose solvent makeup by mass is ethanol 8 water 2. It should be noted that they are not limited to these mixtures.

Examples and Comparative Examples

First, the laminate structures are explained.

The laminate structures are as follows.

(Dry Laminate)

Laminate Structure 1

OPP/each releasing primer composition/one of the respective printing ink compositions for laminate printing/adhesive/one of the respective releasing primer compositions/sealant layer Laminate Structure 2

PET/each releasing primer composition/one of the respective printing ink compositions for laminate printing/adhesive/one of the respective releasing primer composition/sealant layer Laminate Structure 3

NY/each releasing primer composition/one of the respective printing ink compositions for laminate printing/adhesive/one of the respective releasing primer composition/sealant layer Laminate Structure 4

Transparent vapor deposition film/one of the releasing primer compositions/one of the respective printing ink compositions for laminate printing/adhesive/one of the respective releasing primer composition/sealant layer (Extruded Laminate)

Laminate Structure 5

PET, NY, transparent vapor deposition film/one of the releasing primer compositions/one of the respective printing ink compositions for laminate printing/one of the releasing primer compositions/anchor coating agent/sealant layer Laminate Structure 6

OPP/one of the releasing primer compositions/one of the respective printing ink compositions for laminate printing/one of the releasing primer compositions (anchor coating agent)/sealant layer

Example of Manufacturing Polyurethane Resin Varnish 1 (Biomass Polyurethane)

In a four-way flask fitted with an agitator, a cooling tube, and a nitrogen gas introduction tube, 200 parts by mass of a polyester diol of 2,000 in mass-average molecular weight obtained from 30/70 (ratio by mass) sebacic acid (derived from castor oil)/succinic acid (plant derived) and 1,3-propanediol (plant derived), 17.6 parts by mass of isophorone diisocyanate, and 21.0 parts by mass of hydrogenated MDI were added, and the materials were reacted for 6 hours at 100 to 105 °C while introducing nitrogen gas. After letting the mixture cool to near room temperature, 400 parts by mass of ethyl acetate and 171 parts by mass of isopropyl alcohol were added, after which 8.2 parts by mass of isophoronediamine were added to extend the chain, and 0.35 parts by mass of monoethanolamine were further added to cause reaction, and subsequently 1.3 parts by mass of isophoronediamine and 0.6 parts by mass of diethylenetriamine were added to terminate the reaction, to obtain polyurethane resin varnish 1 (solids content 30% by mass, amine value 6.4 mgKOH/g).

Example of Manufacturing Polyurethane Resin Varnish 2 (Not Biomass Polyurethane)

In a four-way flask fitted with an agitator, a cooling tube, and a nitrogen gas introduction tube, 100 parts by mass of a 3-methyl-1,5-pentylene adipate diol of 2,000 in number-average molecular weight, 100 parts by mass of a polypropylene glycol of 2,000 in mass-average molecular weight, 17.6 parts by mass of isophorone diisocyanate, and 21.0 parts by mass of hydrogenated MDI were added, and the materials were reacted for 6 hours at 100 to 105 °C while introducing nitrogen gas. After letting the mixture cool to near room temperature, 400 parts by mass of ethyl acetate and 171 parts by mass of isopropyl alcohol were added, after which 8.2 parts by mass of isophoronediamine were added to extend the chain, and 0.35 parts by mass of monoethanolamine were further added to cause reaction, and subsequently 1.3 parts by mass of isophoronediamine and 0.6 parts by mass of diethylenetriamine were added to terminate the reaction, to obtain polyurethane resin varnish 2 (solids content 30% by mass, amine value 6.4 mgKOH/g).

Example of Manufacturing Polyurethane Resin Varnish 3 Obtained Using Compound Resulting from Ketiminating Amino Groups in Polyamine Compound with Ketone Compound (Method for Manufacturing Ketimine Solution)

51 parts of isophoronediamine, 31.2 parts of N-(2-hydroxyethyl)ethylenediamine, and 174 parts of acetone were mixed and the mixture was agitated for 1 hour at room temperature, to obtain a ketimine solution.

(Method for Manufacturing Polyurethane Resin)

In a four-way flask fitted with an agitator, a cooling tube, and a nitrogen gas introduction tube, 400 parts of a 3-methyl-1,5-pentylene adipate diol of 4,000 in number-average molecular weight, 33.3 parts of isophorone diisocyanate, and 0.04 parts of tetrabutyl titanate were added, and the mixture was reacted for 6 hours at 90 to 100° C. while introducing nitrogen gas.

Next, 812 parts of propyl acetate and 203 parts of isopropyl alcohol were added, after which the mixture was cooled to near room temperature, and then 32.29 parts of the ketimine solution were added and the mixture was agitated for 20 minutes, and 3 parts of water were further added and the mixture was agitated for 15 minutes, to obtain polyurethane resin varnish 3 of 35,000 in mass-average molecular weight and 6.5 mgKOH/g in amine value (solids content 30%).

<Vinyl Chloride/Vinyl Acetate-based Copolymer>

SOLBIN TA-3, Nissin Chemical Industry Co., Ltd.

<Rosin or Derivative Thereof>

Polymerized rosin: Acid value 160 mgKOH/g

<Chlorinated Polypropylene Varnish>

40 parts by mass of a chlorinated polypropylene (solids content 50%) of 40% in chlorination degree and 100,000 in mass-average molecular weight, and 60 parts by mass of methylcyclohexane were mixed under agitation, to obtain a chlorinated polypropylene varnish of 20% in solids content.

<Manufacture of Printing Ink Composition for Laminate>

10 parts by mass of a pigment (C. I. PB 15:4), 30 parts by mass of polyurethane resin varnish 1, and 3 parts by mass of a vinyl chloride/vinyl acetate-based copolymer (SOLBIN TA-3) were kneaded using a paint conditioner by Red Devil, Inc., to which 2 parts by mass of the chlorinated propylene varnish (solids content 20%), 0.5 parts by mass of polymerized rosin, 0.5 parts by mass of silica particles of 4.5 μm in average particle size, 0.2 parts by mass of a polyethylene wax of 2.11 μm in average particle size, 0.2 parts by mass of ethylene-bis-stearic acid amide, 51 parts by mass of solvent, and 2 parts by mass of water were further added, to obtain printing ink composition for laminate 1.

Additionally, printing ink compositions for laminate 2 and 3, adopting polyurethane resin varnish 2 and 3 instead of the polyurethane resin varnish 1, respectively, were also obtained.

(Resin Base Materials)

Corona-discharged biaxially oriented polypropylene film: P-2161 #25 (Toyobo Co., Ltd.) (OPP)

Polyester film: E-5102 #12 (Toyobo Co., Ltd.) (PET)

Nylon film: ON-15 #12 (Unitika Ltd.) (NY)

Transparent vapor deposition polyester film: GL-ARH-F (Toppan Printing Co., Ltd.)

Transparent vapor deposition nylon film: GL-AEY-W (Toppan Printing Co., Ltd.)

(Releasing Primer Compositions 1 to 7)

Releasing primer composition 1: Polyethyleneimine-based compound (product name EPOMIN P-1000 (Nippon Shokubai Co., Ltd.)), number-average molecular weight (Mn) 70,000, mass-average molecular weight (Mw) 350,000, amine value 18 mmol/g, amine ratio (ratio by mol of primary, secondary and tertiary amino groups (%)) of primary/secondary/tertiary=25/50/25 (Table 1 below) (The number-average molecular weight (Mn) was measured according to the viscosity method, mass-average molecular weight (Mw) was measured by GPC, amine value was measured by acid titration in a nonaqueous system, and amine ratio was measured by NMR (13C). (Same applies hereafter.))

Releasing primer composition 2: Polyethyleneimine-based compound (product name EPOMIN P-3000 (Nippon Shokubai Co., Ltd.)), number-average molecular weight (Mn) 100,000, mass-average molecular weight (Mw) 450,000, amine value 18 mmol/g, amine ratio (ratio by mol of primary, secondary and tertiary amino groups (%)) of primary/secondary/tertiary=30/40/30 (Table 1 below) (The mass-average molecular weight (Mw) was measured by GPC, amine value was measured by acid titration in a nonaqueous system, and amine ratio was measured by NMR (13C).)

Releasing primer composition 3: Polyethyleneimine-based compound (product name LUPASOL P (BASF SE)), mass-average molecular weight (Mw) 750,000, amine value 18 mmol/g, amine ratio (ratio by mol of primary, secondary and tertiary amino groups (%)) of primary/secondary/tertiary=37/37/26 (Table 1 below) (The mass-average molecular weight (Mw) was measured by GPC, amine value was measured by acid titration in a nonaqueous system, and amine ratio was measured by NMR (13C).)

Releasing primer composition 4: Polybutadiene-based compound (product name: TITA BOND T-180E (NV10%), Nippon Soda Co., Ltd.)

Releasing primer composition 5: Composition obtained by adding 3-glycidyloxypropyltrimethoxysilane to a polyethyleneimine-based compound (product name EPOMIN P-1000 (Nippon Shokubai Co., Ltd.)) (solids content 3.0% by mass) (Table 1 below): Polyethyleneimine-based compound (product name EPOMIN P-1000 (Nippon Shokubai Co., Ltd.))/3-glycidyloxypropyltrimethoxysilane (percentage by mass)=1/2; the ratio of the number of glycidyl groups in the silane coupling agent relative to that of amino groups in the polyethyleneimine-based compound in Table 2 is obtained based on the aforementioned concept, and represents the value calculated by dividing the number of glycidyl groups, by the total sum of the number of primary amino groups and number of secondary amino groups, in the coated releasing primer composition.

Releasing primer composition 6: Composition obtained by adding triethoxy(3-isocyanatopropyl)silane to a polyethyleneimine-based compound (product name EPOMIN P-1000 (Nippon Shokubai Co., Ltd.)) (solids content 3.0% by mass) (Table 1 below): Polyethyleneimine-based compound (product name EPOMIN P-1000 (Nippon Shokubai Co., Ltd.))/triethoxy(3-isocyanatopropyl)silane (percentage by mass)=1/2; the ratio of the number of isocyanate groups in the silane coupling agent relative to that of amino groups in the polyethyleneimine-based compound in Table 2 is obtained based on the aforementioned concept, and represents the value calculated by dividing the number of isocyanate groups, by the total sum of the number of primary amino groups and number of secondary amino groups, in the coated releasing primer composition.

Releasing primer composition 7: Trimethoxysilylpropyl-modified (polyethyleneimine) (siloxane-modified polyethyleneimine) (product name: SSP-060, Gelest, Inc.), molecular weight (Mn) 1,500 to 1,800, amine value 10 mmol/g (the amine value was measured by acid titration in a nonaqueous system).

TABLE 1

| | Number-average molecular weight | Mass-average molecular weight | Amine value (mmol/g) | Amine ratio (primary: secondary: tertiary) (%)) |
|---|---|---|---|---|
| EPOMIN P-1000 | 70,000 | 350,000 | 18 | 25/50/25 |
| EPOMIN P-3000 | 100,000 | 450,000 | 18 | 30/40/30 |
| LUPASOL P | — | 750,000 | 18 | 37/37/26 |

TABLE 2

| | Coating amount of releasing primer composition ($g/m^2$) | Polyethyleneimine-based compound | | Content of silane coupling agent in primer coating amount | | Ratio of number of glycidyl groups or isocyanate groups in silane coupling agent relative to number of amino groups in polyethyleneimine-based compound |
|---|---|---|---|---|---|---|
| | | Product number | Content in primer coating amount ($g/m^2$) | 3-glycidyloxypropyltrimethoxysilane | Triethoxy(3-isocyanatopropyl)silane | |
| Coating amount of releasing primer composition | 0.18 | P-1000 | 0.06 | 0.12 | | 0.62 |

TABLE 2-continued

| | Coating amount of releasing primer composition (g/m²) | Polyethyleneimine-based compound: Product number | Polyethyleneimine-based compound: Content in primer coating amount (g/m²) | Content of silane coupling agent in primer coating amount: 3-glycidyloxypropyl-trimethoxysilane | Content of silane coupling agent in primer coating amount: Triethoxy(3-isocyanatopro-pyl)silane | Ratio of number of glycidyl groups or isocyanate groups in silane coupling agent relative to number of amino groups in polyethyleneimine-based compound |
|---|---|---|---|---|---|---|
| containing glycidyl group-containing silane coupling agent | | | | | | |
| Coating amount of releasing primer composition containing isocyanate group-containing silane coupling agent | | | | | 0.12 | 0.60 |

(Adhesives)

TAKELAC A-969V/TAKELAC A-5 2-liquid polyurethane adhesive (Mitsui Chemicals, Inc.)

TAKELAC A-515/TAKELAC A-50 2-liquid polyurethane adhesive (Mitsui Chemicals, Inc.)

(Anchor Coating Agents)

TAKELAC A-3210/TAKENATE A-3072 (Mitsui Chemicals, Inc.)

Polyethyleneimine P-1000 (Nippon Shokubai Co., Ltd.), also acting as a releasing primer composition.

(Laminate Films)

P-1128 #25 Cast polypropylene film (Toyobo Co., Ltd.)

RXC-22 Cast polypropylene film (Mitsui Chemicals Tohcello, Inc.)

(Molten Polyethylene)

SUMIKATHENE L705 (Sumitomo Chemical Co., Ltd.)

(Lamination Printing, Laminate, Test Results)

(In the Case of Dry Laminate)

To achieve a laminate of the laminate structure below, each releasing primer composition shown in Table 2 above, obtained by diluting each releasing primer composition, was coated on one side of each resin base material using a gravure printing machine and dried under the following conditions, to obtain a releasing primer layer.

It should be noted that the coating amount in Table 2 represents the solids content of the releasing primer composition layer. This coating amount was adjusted according to the concentration of solids in the releasing primer composition.

On the surface of each releasing primer layer, diluted printing ink composition for laminate 1 obtained by further adding an 80/20 mixed solvent of normal propyl acetate/isopropyl alcohol to printing ink composition for laminate 1, and diluting the mixture to 16 seconds using Zahn Cup No. 3 by Rigosha & Co., Ltd., was printed using a gravure printing machine and dried under the following conditions, to obtain a printed layer.

Thereon, an adhesive (TAKELAC A-969V/TAKELAC A-5) if the resin base material was a corona-discharged biaxially oriented polypropylene film, or an adhesive (TAKELAC A-515/TAKELAC A-50, solids content 30%) if the resin base material was a polyester film, nylon film, transparent vapor deposition polyester film or transparent vapor deposition nylon film, was coated.

Next, the releasing primer layer side of a sealant layer formed by coating the releasing primer layer on one side, was adhered to the printed layer using a dry lamination machine, to create a laminate.

(In the Case of Extruded Laminate)

To achieve a laminate of the laminate structure below, each releasing primer composition shown in Table 2 above, obtained by diluting each releasing primer composition, was coated on one side of each resin base material using a gravure printing machine, and dried under the following conditions, to obtain a releasing primer layer. It should be noted that the coating amount in Table 2 represents the solids content of the releasing primer composition layer.

This coating amount was adjusted according to the concentration of solids in the releasing primer composition. On the surface of each releasing primer layer, diluted printing ink composition for laminate 1 obtained by further adding an 80/20 mixed solvent of normal propyl acetate/isopropyl alcohol to printing ink composition for laminate 1, and diluting the mixture to 16 seconds using Zahn Cup No. 3 by Rigosha & Co., Ltd., was printed using a gravure printing machine and dried under the following conditions, to obtain a printed layer.

Thereon, an anchor coating agent (P-1000) was coated if the resin base material was a corona-discharged biaxially oriented polypropylene film, or each releasing primer composition was coated and dried and then an anchor coating agent (TAKELAC A-3210/TAKENATE A-3072, solids content 7%) was coated if the resin base material was a polyester film, nylon film, transparent vapor deposition polyester film or transparent vapor deposition nylon film.

Next, if the anchor coating agent (TAKELAC A-3210/TAKENATE A-3072, solids content 7%) was coated, the molten polyethylene was coated on the anchor coating agent side using an extrusion lamination machine in a manner adhering it to the anchor coating agent layer, to create a laminate. If P-1000 was used as an anchor coating agent, however, the molten polyethylene was coated on the anchor coating agent layer using an extrusion lamination machine in a manner adhering it to the anchor coating agent layer, to create a laminate.

(Conditions for Coating Each Releasing Primer Composition)

Coating machine: Gravure printing machine
Coating speed: 100 m/min
Printing plate: Helio 175 lines/inch (130°) solid plate
Drying temperature: 70 °C (Printing Conditions for Printing Ink Composition for Laminate 1)

Coating machine: Gravure printing machine
Coating speed: 100 m/min
Printing plate: Helio 175 lines/inch (130°) solid plate
Drying temperature: 55 °C

TABLE 3

| Coating amount (g/m$^2$) | % by mass of solids content in releasing primer composition |
|---|---|
| 0.02 | 0.33 |
| 0.06 | 0.99 |
| 0.09 | 1.49 |
| 0.12 | 1.98 |
| 0.18 | 2.97 |

<Evaluation of Releasing (Ink Release Property)>

Each of the above laminates was taken by 1.5 g and shredded into small pieces of MD 15 mm×TD 25 mm or so, to obtain ink release property test samples.

(Preparation of Release Solution Comprising Aqueous Alkali Solution)

2.0 parts by mass of sodium hydroxide were added to 98.0 parts by mass of water and dissolved under agitation, to obtain a release solution comprising an aqueous alkali solution.

100 grams of the release solution comprising the aqueous alkali solution were put in each HDPE (high-density polyethylene) container of 200 cc in volume, and the container was heated in a hot water bath until the solution temperature reached 70 °C.

(Releasing)

The respective corresponding ink release property test samples were put into the heated release solution above, and the mixture was agitated using stainless-steel agitation blades of 25 mm in blade diameter for 30 minutes. After the agitation, the HDPE (high-density polyethylene) container was removed from the hot water bath and let stand stationary for 5 minutes at room temperature. The release solution and film pieces of respective types were separated using a stainless-steel net of approx. 2 mm in mesh size.

(Rinsing)

The released films of respective types were transferred to a 200-cc HDPE container to which 100 g of water were added. The water was agitated for 5 minutes using stainless-steel agitation blades of 25 mm in blade diameter. After the water had been left stationary for 5 minutes, the film pieces of respective types and the water were separated using a stainless-steel net. After drying the film pieces of respective types, the release property of the ink from the films of respective types was visually evaluated.

(Evaluation Criteria)

○: The ink film completely peels off from the resin base material film and sealant film as a film piece.
Δ: The ink film is completely released from the resin base material film as a film piece, but not released from the sealant film.
x: The ink film peels from neither the resin base material film nor the sealant film.

(Adhesion Property Immediately after Printing (Adhesion Property Immediately after Printing and Drying of Printing Ink Composition for Laminate 1)

On the various types of resin base material films, each releasing primer composition that had been diluted as shown in Table 3 above in order to achieve a specified coating amount was coated using a gravure printing machine and dried under the above conditions. On the surface of this layer of each releasing primer composition, each diluted printing ink composition for laminate 1 obtained by further adding an 80/20 mixed solvent of normal propyl acetate/isopropyl alcohol to each printing ink composition for laminate and diluting the mixture to 16 seconds using Zahn Cup No. 3 by Rigosha & Co., Ltd., was printed using a gravure printing machine and dried under the above conditions, to obtain each printed matter.

An adhesive cellophane tape was adhered to the printed side of each of the obtained printed matters and quickly peeled, to evaluate adhesion property according to the evaluation criteria below based on the degree of peeling of the printed film.

(Evaluation Criteria)

○: The printed film peels from the resin base material film by less than 5% in area ratio.
Δ: The printed film peels from the resin base material film by 5% or more but less than 30% in area ratio.
x: The printed film peels from the resin base material film by 30% or more in area ratio.

(Lamination Strength)

Once obtained, each laminated printed matter was cut to 15 mm in width and measured for T-peel strength using a peel tester manufactured by Yasuda Seiki Seisakusho, Ltd.

System using TAKELAC A-969V/TAKELAC A-5 2-liquid polyurethane adhesive (Mitsui Chemicals, Inc.) as an adhesive (Evaluation Criteria)

○: The peel strength is 1.2 N/15 mm or higher.
Δ: The peel strength is 0.7 N/15 mm or higher but under 1.2 N/15 mm.
x: The peel strength is under 0.7 N/15 mm.

System using TAKELAC A-515/TAKELAC A-50 2-liquid polyurethane adhesive (Mitsui Chemicals, Inc.) as an adhesive (Evaluation Criteria)

○: The peel strength is 5 N/15 mm or higher.
Δ: The peel strength is 3 N/15 mm or higher but under 5 N/15 mm.
x: The peel strength is under 3 N/15 mm.

(Anti-Blocking Property)

On the various types of resin base material films, each releasing primer composition that had been diluted as shown in Table 3 above was coated using a gravure printing machine and dried under the above conditions. On the surface of this layer of each releasing primer composition, each diluted printing ink composition for laminate obtained by further adding an 80/20 mixed solvent of normal propyl acetate/isopropyl alcohol to each printing ink composition for laminate, and diluting the mixture to 16 seconds using Zahn Cup No. 3 by Rigosha & Co., Ltd., was printed using a gravure printing machine and dried under the above conditions; thereafter, the printed side of each printed matter and untreated side of each resin base material film were put together and left standing for 12 hours at 40 °C under a load of 400 g/cm$^2$, after which each resin base material film was peeled to evaluate anti-blocking property based on the peeling condition.

(Evaluation Criteria)

○: The film peels without resistance and there is no transfer of the ink film at all.

Δ: Resistance is felt, but there is no transfer of the ink film at all.

x: Transfer of the ink film is observed.

The evaluations below were the same regardless of whether printing ink composition for laminate 1 above, or printing ink composition for laminate 2 or 3 above, was used. Accordingly, the results with printing ink composition for laminate 1 above are shown below.

(Dry Laminate)

Laminate Structure 1

OPP/one of the respective releasing primer compositions/one of the respective printing ink compositions for laminate printing/adhesive/one of the respective releasing primer compositions/sealant layer (P-1128 #25)

Examples and Comparative Example Shown in Table 4 Below

In each Example shown in Table 4, P-2161 #25 was adopted as a resin base material, on which one of the respective releasing primer compositions, a printing ink composition for laminate, an adhesive (TAKELAC A-969V/TAKELAC A-5, solids content 30%), one of the respective releasing primer compositions, and P-1128 #25, were used to form the respective layers in this order. As a result, all evaluation results were excellent.

It should be noted that, in terms of the releasing primer composition, Examples 1 to 7 are examples of using one containing a polyethyleneimine compound, Example 8 is an example of using a polybutadiene-based compound, Example 9 is an example of using a polyethyleneimine compound containing a glycidyl group-containing silane coupling agent, Example 10 is an example of using a polyethyleneimine compound containing an isocyanate group-containing silane coupling agent, and Example 11 is an example of using one containing a siloxane-modified polyethyleneimine compound. In the case of laminate structure 1, "coated on both sides" means the releasing primer composition was coated on the resin base material, and also between the adhesive layer and the laminate layer, thereby forming releasing primer layers.

Additionally, Comparative Example 1 shown in Table 4 is an example of forming neither of the two layers by the releasing primer composition as opposed to the Examples. As a result, release was insufficient.

TABLE 4

| | | Coating amount (g/m$^2$) | Release | Adhesion property immediately after printing | Lamination strength | Anti-blocking property |
|---|---|---|---|---|---|---|
| Comparative Example 1 | Releasing primer composition not coated. | — | X | ○ | ○ | ○ |
| Example 1 | Releasing primer composition 1 coated on both sides. | 0.02 | Δ | ○ | ○ | ○ |
| Example 2 | | 0.06 | ○ | ○ | ○ | ○ |
| Example 3 | | 0.09 | ○ | ○ | ○ | ○ |
| Example 4 | | 0.12 | ○ | ○ | ○ | ○ |
| Example 5 | | 0.18 | ○ | ○ | ○ | ○ |
| Example 6 | Releasing primer composition 2 coated on both sides. | 0.18 | ○ | ○ | ○ | ○ |
| Example 7 | Releasing primer composition 3 coated on both sides. | 0.18 | ○ | ○ | ○ | ○ |
| Example 8 | Releasing primer composition 4 coated on both sides. | 0.18 | ○ | ○ | ○ | ○ |
| Example 9 | Releasing primer composition 5 coated on both sides. | 0.18 | ○ | ○ | ○ | ○ |
| Example 10 | Releasing primer composition 6 coated on both sides. | 0.18 | ○ | ○ | ○ | ○ |

TABLE 4-continued

| | | Coating amount (g/m$^2$) | Release | Adhesion property immediately after printing | Lamination strength | Anti-blocking property |
|---|---|---|---|---|---|---|
| Example 11 | Releasing primer composition 7 coated on both sides. | 0.18 | ○ | ○ | ○ | ○ |

Dry Laminate

Laminate Structure 2

PET/one of the respective releasing primer compositions/one of the respective printing ink compositions for laminate printing/adhesive/one of the respective releasing primer compositions/sealant layer (RXC-22)

Examples and Comparative Example Shown in Table 5 Below

In each Example shown in Table 5, E-5102 #12 was adopted as a resin base material, on which one of the respective releasing primer compositions, a printing ink composition for laminate, an adhesive (TAKELAC A-515/TAKELAC A-50, solids content 30%), one of the respective releasing primer compositions, and RXC-22, were used to form the respective layers in this order. As a result, all evaluation results were excellent.

It should be noted that, in terms of the releasing primer composition, Examples 12 to 18 are examples of using one containing a polyethyleneimine compound, Example 19 is an example of using a polybutadiene-based compound, Example 20 is an example of using a polyethyleneimine compound containing a glycidyl group-containing silane coupling agent, Example 21 is an example of using a polyethyleneimine compound containing an isocyanate group-containing silane coupling agent, and Example 22 is an example of using one containing a siloxane-modified polyethyleneimine compound. In the case of laminate structure 2, "coated on both sides" means the releasing primer composition was coated on the resin base material, and also between the adhesive layer and the laminate layer, thereby forming releasing primer layers.

Additionally, Comparative Example 2 shown in Table 5 is an example of forming neither of the two layers by the releasing primer composition as opposed to the Examples. As a result, release was insufficient.

TABLE 5

| | | Coating amount (g/m$^2$) | Release | Adhesion property immediately after printing | Lamination strength | Anti-blocking property |
|---|---|---|---|---|---|---|
| Comparative Example 2 | Releasing primer composition not coated. | — | X | ○ | ○ | ○ |
| Example 12 | Releasing primer composition 1 coated on both sides. | 0.02 | Δ | ○ | ○ | ○ |
| Example 13 | | 0.06 | ○ | ○ | ○ | ○ |
| Example 14 | | 0.09 | ○ | ○ | ○ | ○ |
| Example 15 | | 0.12 | ○ | ○ | ○ | ○ |
| Example 16 | | 0.18 | ○ | ○ | ○ | ○ |
| Example 17 | Releasing primer composition 2 coated on both sides. | 0.18 | ○ | ○ | ○ | ○ |
| Example 18 | Releasing primer composition 3 coated on both sides. | 0.18 | ○ | ○ | ○ | ○ |
| Example 19 | Releasing primer composition 4 coated on both sides. | 0.18 | ○ | ○ | ○ | ○ |
| Example 20 | Releasing primer composition 5 coated on both sides. | 0.12 | ○ | ○ | ○ | ○ |
| Example 21 | Releasing primer composition 6 coated on both sides. | 0.18 | ○ | ○ | ○ | ○ |

TABLE 5-continued

| | | Coating amount (g/m²) | Release | Adhesion property immediately after printing | Lamination strength | Anti-blocking property |
|---|---|---|---|---|---|---|
| Example 22 | Releasing primer composition 7 coated on both sides. | 0.18 | ○ | ○ | ○ | ○ |

Dry Laminate

Laminate Structure 3

NY/one of the respective releasing primer compositions/one of the respective printing ink compositions for laminate printing/adhesive/one of the respective releasing primer compositions/sealant layer (RXC-22)

Examples and Comparative Example Shown in Table 6 Below

In each Example shown in Table 6, ON #15 was adopted as a resin base material, on which one of the respective releasing primer compositions, a printing ink composition for laminate, an adhesive (TAKELAC A-515/TAKELAC A-50, solids content 30%), one of the respective releasing primer compositions, and RXC-22, were used to form the respective layers in this order. As a result, all evaluation results were excellent.

It should be noted that, in terms of the releasing primer composition, Examples 23 to 29 are examples of using one containing a polyethyleneimine-based compound, Example 30 is an example of using a polybutadiene-based compound, Example 31 is an example of using a polyethyleneimine compound containing a glycidyl group-containing silane coupling agent, Example 32 is an example of using a polyethyleneimine compound containing an isocyanate group-containing silane coupling agent, and Example 33 is an example of using one containing a siloxane-modified polyethyleneimine compound. In the case of laminate structure 3, "coated on both sides" means the releasing primer composition was coated on the resin base material, and also between the adhesive layer and the laminate layer, thereby forming releasing primer layers.

Additionally, Comparative Example 3 shown in Table 6 is an example of forming neither of the two layers by the releasing primer composition as opposed to the Examples. As a result, release was insufficient.

TABLE 6

| | | Coating amount (g/m²) | Release | Adhesion property immediately after printing | Lamination strength | Anti-blocking property |
|---|---|---|---|---|---|---|
| Comparative Example 3 | Releasing primer composition not coated. | — | X | ○ | ○ | ○ |
| Example 23 | Releasing primer composition 1 coated on both sides. | 0.02 | Δ | ○ | ○ | ○ |
| Example 24 | | 0.06 | ○ | ○ | ○ | ○ |
| Example 25 | | 0.09 | ○ | ○ | ○ | ○ |
| Example 26 | | 0.12 | ○ | ○ | ○ | ○ |
| Example 27 | | 0.18 | ○ | ○ | ○ | ○ |
| Example 28 | Releasing primer composition 2 coated on both sides. | 0.18 | ○ | ○ | ○ | ○ |
| Example 29 | Releasing primer composition 3 coated on both sides. | 0.18 | ○ | ○ | ○ | ○ |
| Example 30 | Releasing primer composition 4 coated on both sides. | 0.18 | ○ | ○ | ○ | ○ |
| Example 31 | Releasing primer composition 5 coated on both sides. | 0.12 | ○ | ○ | ○ | ○ |
| Example 32 | Releasing primer composition 6 coated on both sides. | 0.18 | ○ | ○ | ○ | ○ |

TABLE 6-continued

| | | Coating amount (g/m²) | Release | Adhesion property immediately after printing | Lamination strength | Anti-blocking property |
|---|---|---|---|---|---|---|
| Example 33 | Releasing primer composition 7 coated on both sides. | 0.18 | ○ | ○ | ○ | ○ |

Dry Laminate

Laminate Structure 4

Transparent vapor deposition film/one of the respective releasing primer compositions/one of the respective printing ink compositions for laminate printing/adhesive/one of the respective releasing primer compositions/sealant layer (RXC-22)

In each Example shown in Table 7, GL-ARH-F or GL-AEY-W was adopted as a resin base material, on which one of the respective releasing primer compositions, a printing ink composition for laminate, an adhesive (TAKELAC A-515/TAKELAC A-50, solids content 30%), one of the respective releasing primer compositions, and RXC-22, were used to form the respective layers in this order. As a result, all evaluation results were excellent.

It should be noted that, in terms of the releasing primer composition, Examples 34 to 40 are examples of using one containing a polyethyleneimine-based compound, Example 41 is an example of using a polybutadiene-based compound, Example 42 is an example of using a polyethyleneimine compound containing a glycidyl group-containing silane coupling agent, Example 43 is an example of using a polyethyleneimine compound containing an isocyanate group-containing silane coupling agent, and Example 44 is an example of using one containing a siloxane-modified polyethyleneimine compound. In the case of laminate structure 4, "coated on both sides" means the releasing primer composition was coated on the resin base material, and also between the adhesive layer and the laminate layer, thereby forming releasing primer layers. The evaluations were the same regardless of which of the transparent vapor deposition films GL-ARH-F and GL-AEY-W was used, and accordingly Table 7 shows the evaluation results with both GL-ARH-F and GL-AEY-W.

Additionally, Comparative Example 4 shown in Table 7 is an example of forming neither of the two layers by the releasing primer composition as opposed to the Examples. As a result, release was insufficient.

TABLE 7

| | | Coating amount (g/m²) | Release | Adhesion property immediately after printing | Lamination strength | Anti-blocking property |
|---|---|---|---|---|---|---|
| Comparative Example 4 | Releasing primer composition not coated. | — | X | ○ | ○ | ○ |
| Example 34 | Releasing primer composition 1 coated on both sides. | 0.02 | Δ | ○ | ○ | ○ |
| Example 35 | | 0.06 | ○ | ○ | ○ | ○ |
| Example 36 | | 0.09 | ○ | ○ | ○ | ○ |
| Example 37 | | 0.12 | ○ | ○ | ○ | ○ |
| Example 38 | | 0.18 | ○ | ○ | ○ | ○ |
| Example 39 | Releasing primer composition 2 coated on both sides. | 0.18 | ○ | ○ | ○ | ○ |
| Example 40 | Releasing primer composition 3 coated on both sides. | 0.18 | ○ | ○ | ○ | ○ |
| Example 41 | Releasing primer composition 4 coated on both sides. | 0.18 | ○ | ○ | ○ | ○ |
| Example 42 | Releasing primer composition 5 coated on both sides. | 0.12 | ○ | ○ | ○ | ○ |
| Example 43 | Releasing primer composition 6 coated on both sides. | 0.18 | ○ | ○ | ○ | ○ |

TABLE 7-continued

| | | Coating amount (g/m$^2$) | Release | Adhesion property immediately after printing | Lamination strength | Anti-blocking property |
|---|---|---|---|---|---|---|
| Example 44 | Releasing primer composition 7 coated on both sides. | 0.18 | ○ | ○ | ○ | ○ |

(Extruded Laminate)

Laminate Structure 5

PET, NY, transparent vapor deposition film/one of the respective releasing primer compositions/one of the respective printing ink compositions for laminate printing/one of the respective releasing primer compositions/anchor coating agent/sealant layer (SUMIKATHENE L705)

In each Example shown in Table 8, E-5102 #12, ON #15, GL-ARH-F was adopted as a resin base material, on which one of the respective releasing primer compositions, a printing ink composition for laminate, one of the respective releasing primer compositions, an anchor coating agent (TAKELAC A-3210/TAKENATE A-3072, solids content 7%), and SUMIKATHENE L705 by means of extrusion lamination, were used to form the respective layers in this order. As a result, all evaluation results were excellent.

It should be noted that, in terms of the releasing primer composition, Examples 45 to 50 are examples of using one containing a polyethyleneimine-based compound, Example 51 is an example of using a polybutadiene-based compound, Example 52 is an example of using a polyethyleneimine compound containing a glycidyl group-containing silane coupling agent, Example 53 is an example of using a polyethyleneimine compound containing a glycidyl group-containing silane coupling agent, Example 54 is an example of using a polyethyleneimine compound containing an isocyanate group-containing silane coupling agent, and Example 55 is an example of using one containing a siloxane-modified polyethyleneimine compound. In the case of laminate structure 5, "coated on both sides" means the releasing primer composition was coated on the resin base material, and also between the anchor coating layer and the extruded laminate layer, thereby forming releasing primer layers. The evaluations were the same regardless of which of the films E-5102 #12, ON #15 and GL-ARH-F was used, and accordingly Table 8 shows the evaluation results of all E-5102 #12, ON #15 and GL-ARH-F.

Additionally, Comparative Example 5 shown in Table 8 is an example of forming neither of the two layers by the releasing primer composition as opposed to the Examples. As a result, release was insufficient.

TABLE 8

| | | Coating amount (g/m$^2$) | Release | Adhesion property immediately after printing | Lamination strength | Anti-blocking property |
|---|---|---|---|---|---|---|
| Comparative Example 5 | Releasing primer composition not coated. | — | X | ○ | ○ | ○ |
| Example 45 | Releasing primer composition 1 coated on both sides. | 0.02 | Δ | ○ | ○ | ○ |
| Example 46 | | 0.06 | ○ | ○ | ○ | ○ |
| Example 47 | | 0.09 | ○ | ○ | ○ | ○ |
| Example 48 | | 0.12 | ○ | ○ | ○ | ○ |
| Example 49 | | 0.18 | ○ | ○ | ○ | ○ |
| Example 50 | Releasing primer composition 2 coated on both sides. | 0.18 | ○ | ○ | ○ | ○ |
| Example 51 | Releasing primer composition 3 coated on both sides. | 0.18 | ○ | ○ | ○ | ○ |
| Example 52 | Releasing primer composition 4 coated on both sides. | 0.18 | ○ | ○ | ○ | ○ |
| Example 53 | Releasing primer composition 5 coated on both sides. | 0.12 | ○ | ○ | ○ | ○ |

TABLE 8-continued

| | | Coating amount ($g/m^2$) | Release | Adhesion property immediately after printing | Lamination strength | Anti-blocking property |
|---|---|---|---|---|---|---|
| Example 54 | Releasing primer composition 6 coated on both sides. | 0.18 | ○ | ○ | ○ | ○ |
| Example 55 | Releasing primer composition 7 coated on both sides. | 0.18 | ○ | ○ | ○ | ○ |

(Extruded Laminate)

Laminate Structure 6

OPP/each releasing primer composition/one of the respective printing ink compositions for laminate printing/one of the respective releasing primer compositions (anchor coating agent)/sealant layer (SUMIKATHENE L705)

(SUMIKATHENE L705)

In each Example shown in Table 9, P-2161 #25 was adopted as a resin base material, on which one of the respective releasing primer compositions, a printing ink composition for laminate, one of the respective releasing primer compositions (also working as anchor coating agent), and SUMIKATHENE L705 by means of extrusion lamination, were used to form the respective layers in this order. As a result, all evaluation results were excellent.

It should be noted that, in terms of the releasing primer composition, Examples 56 to 61 are examples of using one containing a polyethyleneimine-based compound, Example 62 is an example of using a polybutadiene-based compound, Example 63 is an example of using a polyethyleneimine compound containing a glycidyl group-containing silane coupling agent, Example 64 is an example of using a polyethyleneimine compound containing a glycidyl group-containing silane coupling agent, Example 65 is an example of using a polyethyleneimine compound containing an isocyanate group-containing silane coupling agent, and Example 66 is an example of using one containing a siloxane-modified polyethyleneimine compound. In the case of laminate structure 6, "coated on both sides" means the releasing primer composition was coated on the resin base material, and also between the printed layer and the extruded laminate layer, thereby forming releasing primer layers.

Additionally, Comparative Example 6 shown in Table 9 is an example of forming neither of the two layers by the releasing primer composition as opposed to the Examples. As a result, release was insufficient.

TABLE 9

| | | Coating amount ($g/m^2$) | Release | Adhesion property immediately after printing | Lamination strength | Anti-blocking property |
|---|---|---|---|---|---|---|
| Comparative Example 6 | Releasing primer composition not coated. | — | X | ○ | ○ | ○ |
| Example 56 | Releasing primer composition 1 coated on both sides. | 0.02 | Δ | ○ | ○ | ○ |
| Example 57 | | 0.06 | ○ | ○ | ○ | ○ |
| Example 58 | | 0.09 | ○ | ○ | ○ | ○ |
| Example 59 | | 0.12 | ○ | ○ | ○ | ○ |
| Example 60 | | 0.18 | ○ | ○ | ○ | ○ |
| Example 61 | Releasing primer composition 2 coated on both sides. | 0.18 | ○ | ○ | ○ | ○ |
| Example 62 | Releasing primer composition 3 coated on both sides. | 0.18 | ○ | ○ | ○ | ○ |
| Example 63 | Releasing primer composition 4 coated on both sides. | 0.18 | ○ | ○ | ○ | ○ |
| Example 64 | Releasing primer composition 5 coated on both sides. | 0.12 | ○ | ○ | ○ | ○ |

TABLE 9-continued

| | | Coating amount ($g/m^2$) | Release | Adhesion property immediately after printing | Lamination strength | Anti-blocking property |
|---|---|---|---|---|---|---|
| Example 65 | Releasing primer composition 6 coated on both sides. | 0.18 | ○ | ○ | ○ | ○ |
| Example 66 | Releasing primer composition 7 coated on both sides. | 0.18 | ○ | ○ | ○ | ○ |

Releasing Primer Composition 8

Releasing primer composition 8 ((number of glycidyl groups in the silane coupling agent)/(total sum of the number of primary amino groups and number of secondary amino groups in the polyethyleneimine-based compound) =1.55) was obtained in the same manner as releasing primer composition 5, except that the ratio of polyethyleneimine-based compound (product name EPOMIN P-1000 (Nippon Shokubai Co., Ltd))/3-glycidyloxypropyltrimethoxysilane (percentage by mass) was changed from 1/2 in releasing primer composition 5, to 1/5.

Laminate structures 1 to 6 using releasing primer composition 8 received a "O" for all of: release, adhesion property immediately after printing, lamination strength, and anti-blocking property.

What is claimed:

1. A laminate comprising a resin base material, a first releasing primer layer, a printed layer, a second releasing primer layer, and a sealant layer, being stacked in this order, wherein the first releasing primer layer separates and releases the resin base material from the printed layer in a recycling process, the second releasing primer layer separates and releases the sealant layer from the printed layer in the recycling process, and a releasing primer composition for forming the first and second releasing primer layers contains a polyethyleneimine-based compound with an amine value of 5.0 to 25.0 mmol/g and/or polybutadiene-based compound.

2. The laminate according to claim 1, wherein the polyethyleneimine-based compound with an amine value of 5.0 to 25.0 mmol/g and/or polybutadiene-based compound is one or more component selected from (a) to (d) below:

(a) a polybutadiene-based compound, (b) a polyethyleneimine compound, (c) a mixture containing a polyethyleneimine compound and a glycidyl group-containing silane coupling agent and/or isocyanate group-containing silane coupling agent, and (d) a siloxane-modified polyethyleneimine compound, wherein the polyethyleneimine compound in each of (b) and (c) does not include the siloxane-modified polyethyleneimine compound in (d).

3. The laminate according to claim 2, wherein the releasing primer composition contains (b), (c), and/or (d), wherein a number-average molecular weight of the polyethyleneimine compound, and that of the siloxane-modified polyethyleneimine compound, are each independently 1,000 to 200,000.

4. The laminate according to claim 2, wherein the releasing primer composition contains (b), (c), and/or (d), wherein a mass-average molecular weight of the polyethyleneimine compound, and that of the siloxane-modified polyethyleneimine compound, are each independently 4,000 to 800,000.

5. The laminate using the releasing primer composition according to claim 2, wherein the releasing primer composition contains (a), wherein the polybutadiene-based compound is a hydroxyl group-containing polybutadiene compound and/or carboxyl group-containing polybutadiene compound.

6. The laminate according to claim 2, wherein the laminate is one of (1) to (3) below:

(1) a laminate having, in this order, the resin base material, the first releasing primer layer, the printed layer, an adhesive layer, the second releasing primer layer, and the sealant layer formed by dry lamination, (2) a laminate having, in this order, the resin base material, the first releasing primer layer, the printed layer, the second releasing primer layer, an anchor coating agent layer, and the sealant layer formed by extrusion lamination, and (3) a laminate having, in this order, the resin base material, the first releasing primer layer, the printed layer, the second releasing primer layer, and the sealant layer formed by extrusion lamination.

7. The laminate using the releasing primer composition according to claim 2, wherein the sealant layer is formed by a cast plastic film or molten resin.

8. The laminate according to claim 1, wherein the laminate is one of (1) to (3) below:

(1) a laminate having, in this order, the resin base material, the first releasing primer layer, the printed layer, an adhesive layer, the second releasing primer layer, and the sealant layer formed by a dry laminate, (2) a laminate formed by extrusion lamination, which has, in this order, the resin base material, the first releasing primer layer, the printed layer, the second releasing primer layer, an anchor coating agent layer, and the sealant layer formed by an extrusion laminate, and (3) a laminate formed by extrusion lamination, which has, in this order, the resin base material, the first releasing primer layer, the printed layer, the second releasing primer layer, and the sealant layer formed by an extrusion laminate.

9. The laminate using the releasing primer composition according to claim 1, wherein the sealant layer is formed by a cast plastic film or molten resin.

* * * * *